(12) United States Patent
Leung et al.

(10) Patent No.: US 7,092,977 B2
(45) Date of Patent: Aug. 15, 2006

(54) TECHNIQUES FOR STORING DATA BASED UPON STORAGE POLICIES

(75) Inventors: Albert Leung, Los Altos, CA (US); Giovanni Paliska, Mountain View, CA (US); Bruce Greenblatt, San Jose, CA (US); Claudia Chandra, Cupertino, CA (US)

(73) Assignee: Arkivio, Inc., Mountain View, CA (US)

(*) Notice: Subject to any disclaimer, the term of this patent is extended or adjusted under 35 U.S.C. 154(b) by 243 days.

(21) Appl. No.: 10/232,875

(22) Filed: Aug. 30, 2002

(65) Prior Publication Data

US 2003/0046270 A1    Mar. 6, 2003

Related U.S. Application Data

(60) Provisional application No. 60/358,915, filed on Feb. 21, 2002, provisional application No. 60/316,764, filed on Aug. 31, 2001, provisional application No. 60/340,227, filed on Dec. 14, 2001.

(51) Int. Cl.
*G06F 12/00* (2006.01)

(52) U.S. Cl. ..................................... 707/205
(58) Field of Classification Search ............... 707/1, 707/200, 205
See application file for complete search history.

(56) References Cited

U.S. PATENT DOCUMENTS

| | | | |
|---|---|---|---|
| 4,901,231 A | 2/1990 | Bishop et al. | |
| 5,053,948 A | 10/1991 | DeClute et al. | |
| 5,063,523 A | 11/1991 | Vrenjak | |
| 5,131,087 A | 7/1992 | Warr | |
| 5,202,982 A | 4/1993 | Gramlich et al. | |
| 5,276,867 A | 1/1994 | Kenley et al. | |
| 5,317,728 A | 5/1994 | Tevis et al. | |
| 5,333,315 A | 7/1994 | Saether et al. | |
| 5,367,698 A | 11/1994 | Webber et al. | |
| 5,471,677 A * | 11/1995 | Imanaka ..................... | 707/5 |
| 5,475,834 A | 12/1995 | Anglin et al. | |
| 5,485,606 A | 1/1996 | Midgley et al. | |
| 5,506,986 A | 4/1996 | Healy | |
| 5,606,689 A | 2/1997 | Nakagawa | |
| 5,689,681 A | 11/1997 | Petersen | |
| 5,701,415 A | 12/1997 | Wei | |
| 5,708,806 A | 1/1998 | DeRose et al. | |
| 5,778,395 A | 7/1998 | Whiting et al. | |
| 5,798,766 A | 8/1998 | Hayashi et al. | |

(Continued)

FOREIGN PATENT DOCUMENTS

WO    WO 03/021441    3/2003

(Continued)

OTHER PUBLICATIONS

HSM For NetWare- White Paper: A Guide to Hierarchical Storage Management from http://support.ca.com/techbases/hsm/HSMWhitePaper.html visited on Jan. 10, 2003.

(Continued)

*Primary Examiner*—Greta Robinson
*Assistant Examiner*—Kuen S. Lu
(74) *Attorney, Agent, or Firm*—Townsend and Townsend and Crew LLP

(57) ABSTRACT

Automated techniques for storing data in a data storage environment. Techniques are provided for determining storage locations for data in a heterogeneous storage environment based upon storage policies configured for the storage environment. The data is stored in storage locations that enable efficient data access while optimizing the use of available storage resources with minimum human intervention.

49 Claims, 6 Drawing Sheets

U.S. PATENT DOCUMENTS

| | | | |
|---|---|---|---|
| 5,819,296 A | 10/1998 | Anderson et al. | |
| 5,873,103 A | 2/1999 | Trede et al. | |
| 5,933,603 A | 8/1999 | Vahalia et al. | |
| 5,978,815 A | 11/1999 | Cabrera et al. | |
| 5,983,318 A * | 11/1999 | Willson et al. | 711/113 |
| 5,991,753 A | 11/1999 | Wilde | |
| 6,023,709 A | 2/2000 | Anglin et al. | |
| 6,035,373 A | 3/2000 | Iwata | |
| 6,038,379 A | 3/2000 | Fletcher et al. | |
| 6,154,817 A | 11/2000 | Mohan et al. | |
| 6,269,382 B1 | 7/2001 | Cabrera et al. | |
| 6,330,572 B1 | 12/2001 | Sitka | |
| 6,330,610 B1 * | 12/2001 | Docter et al. | 709/229 |
| 6,336,175 B1 | 1/2002 | Shaath et al. | |
| 6,339,793 B1 | 1/2002 | Bostian et al. | |
| 6,366,988 B1 | 4/2002 | Skiba et al. | |
| 6,370,545 B1 | 4/2002 | Shaath | |
| 6,404,925 B1 * | 6/2002 | Foote et al. | 382/224 |
| 6,415,280 B1 * | 7/2002 | Farber et al. | 707/2 |
| 6,438,642 B1 | 8/2002 | Shaath | |
| 6,449,731 B1 | 9/2002 | Frey, Jr. | |
| 6,453,325 B1 | 9/2002 | Cabrera et al. | |
| 6,460,070 B1 | 10/2002 | Turek et al. | |
| 6,466,952 B1 | 10/2002 | Hanes et al. | |
| 6,493,756 B1 | 12/2002 | O'Brien et al. | |
| 6,519,637 B1 | 2/2003 | Arkeketa et al. | |
| 6,584,497 B1 | 6/2003 | Case et al. | |
| 6,631,477 B1 | 10/2003 | LeCrone et al. | |
| 6,654,864 B1 | 11/2003 | Shaath et al. | |
| 6,662,235 B1 | 12/2003 | Callis et al. | |
| 6,678,248 B1 | 1/2004 | Haddock et al. | |
| 6,839,766 B1 | 1/2005 | Parnafes et al. | |
| 6,915,338 B1 | 7/2005 | Hunt et al. | |
| 6,920,447 B1 | 7/2005 | Pudipeddi et al. | |
| 6,941,560 B1 | 9/2005 | Lowry et al. | |
| 6,990,667 B1 | 1/2006 | Ulrich et al. | |
| 2001/0034795 A1 * | 10/2001 | Moulton et al. | 709/244 |
| 2001/0037475 A1 | 11/2001 | Bradshaw et al. | |
| 2002/0107878 A1 | 8/2002 | Tauchide et al. | |
| 2002/0138251 A1 * | 9/2002 | Geary | 704/200 |
| 2002/0174139 A1 | 11/2002 | Midgley et al. | |
| 2002/0174288 A1 | 11/2002 | Ulrich et al. | |
| 2003/0005457 A1 | 1/2003 | Faibish et al. | |
| 2003/0046313 A1 | 3/2003 | Leung et al. | |
| 2003/0115204 A1 | 6/2003 | Greenblatt et al. | |
| 2004/0039891 A1 | 2/2004 | Leung et al. | |
| 2004/0049513 A1 | 3/2004 | Yakir et al. | |
| 2004/0054656 A1 | 3/2004 | Leung et al. | |
| 2004/0083202 A1 | 4/2004 | Mu et al. | |
| 2004/0163029 A1 | 8/2004 | Foley et al. | |
| 2005/0015409 A1 | 1/2005 | Wen et al. | |
| 2005/0021566 A1 | 1/2005 | Mu | |
| 2005/0033757 A1 | 2/2005 | Greenblatt et al. | |
| 2006/0010150 A1 | 1/2006 | Shaath et al. | |

FOREIGN PATENT DOCUMENTS

| | | |
|---|---|---|
| WO | WO 03/025795 | 3/2003 |
| WO | WO 03/052620 | 6/2003 |
| WO | WO 04/021123 | 3/2004 |
| WO | WO 04/021223 | 3/2004 |
| WO | WO 04/021224 | 3/2004 |
| WO | WO 04/021225 | 3/2004 |
| WO | WO 04/051481 | 6/2004 |
| WO | WO 04/109556 | 12/2004 |
| WO | WO 04/109663 | 12/2004 |
| WO | WO 05/001646 | 1/2005 |

OTHER PUBLICATIONS

SafeCapacity™ User's Manual Version 2.14 (Jan. 1, 2002) Solution-Soft, Santa Clara, CA 48 pages total.

Powers, S. et al. (Jul. 1999) "Complementing AS/400 Storage Management Using Hierarchical Storage Management APIs, A Practical Approach to AS/400 Storage Management," International Technical Support Organization, from http://www.redbooks.ibm.com/pubs/pdfs/redbooks/sg244450.pdf visited on Jan. 10, 2003.

Bhattacharya et al., "Coordinating Backup/Recovery and Data Consistency Between Database and File Systems," *Procs. 2002 ACM SIGMOD Int. Conf. on Management of Data*, pp. 500-511 (2002).

Welch et al., "A Resilient Application-Level Failure Detection System for Distributed Computing Environments," *Computers and Communications* (1995) IEEE Symposium on Jun. 27-29, 1995-96.

Moore et al., "Policy Core Information Model Extensions," Internet Draft, Draft-IETF-Policy-PCIM-EXT-06.TXT, Nov. 8, 2001, pp. 1-85 downloaded from http://www.watersprings.org/pub/id/draft-ietf-policy-pcim-ext-06.txt on Feb. 2, 2005.

Strassner et al., "Policy Framework Definition Language," Internet Draft, Draft-IETF-Policy-Framework-PFDL-00.TXT, Nov. 17, 1998, pp. 1-18 downloaded from http://www.watersprings.org/pub/id/draft-ietf-policy-framework-pfdl-00.txt on Mar. 2, 2005.

Waters et al., "Policy Framework Architecture," Internet Draft, Draft-IETF-Policy-Arch-00.TXT, Feb. 26, 1999, pp. 1-18 downloaded from http://www.watersprings.org/pub/id/draft-ietf-policy-arch-00-txt on Mar. 2, 2005.

Wolfson et al., "Managing Communication Networks by Monitoring Databases," *IEEE Trans. Software Engineering*, 17(9):944-953 (1991).

Microsoft Corporation, Microsoft Windows 2000 Server white paper, Enterprise Class Storage in Windows 2000, 1999, pp. 11, 19, 20.

The PC Guide, May 11, 2001, http://web.archive.org/web/20010511060256/http://www.pcguide.com/ref/hdd/file/ntfs/sec_Res.htm.

Siyan, K.S., "Windows 2000 Server Professional Reference, Jul. 10, 2000, ISBN 0-7357-0952-1," Implementing File System Security Using File Permissions, chapter 9.

Sun (Sun Microsystems, Inc., "Solstice Backup™ 5.5, Administration Guide", Part No. 806-1135-10, Sep. 1999, Revision A), p. 1-2, 140-141.

* cited by examiner

| File selection criteria | Data usage criteria | Location constraint |
|---|---|---|
| File type is "Office files" | Last access <= 7 days | Local |
| File type is "Office files" | 7 days < Last access <= 30 days | Bandwidth > 40MB |
| File type is "Office files" | Last access > 30 days | NONE |
| File type is "Email files" | Last access <= 7 days | Volume group == New_volumes |
| Relevance score >= 0.5 | Last access <= 30 days | Bandwidth > 40 MB |
| Null (default) | Last access <= 7 days | Local |
| Null (default) | Last access > 7 days | Bandwidth > 40 MB |

Fig. 3

TECHNIQUES FOR STORING DATA BASED UPON STORAGE POLICIES

CROSS-REFERENCES TO RELATED APPLICATIONS

This application claims priority from and is a non-provisional of the following applications, the entire contents of which are herein incorporated by reference for all purposes:

(1) U.S. Provisional Patent Application No. 60/316,764 filed Aug. 31, 2001; and (2) U.S. Provisional Patent Application No. 60/358,915 filed Feb. 21, 2002.

This application also incorporates by reference for all purposes the entire contents of the following applications:

(1) U.S. Provisional Patent Application No. 60/340,227 filed Dec. 14, 2001; and (2) U.S. Non-Provisional patent application Ser. No. 10/133,123 filed Apr. 25, 2002.

BACKGROUND OF THE INVENTION

The present invention relates generally to the field of data storage and management, and more particularly to techniques for determining storage locations for data in a storage environment based upon storage policies configured for the storage environment.

Heterogeneous and complex storage environments comprising storage systems and devices with different cost, capacity, bandwidth, and other performance characteristics are rapidly replacing conventional homogeneous data storage environments. Due to their heterogeneous nature, managing storage of data in such environments is a difficult and complex task. An important information management function in such heterogeneous data storage environments is to determine where to store the data among the various available storage devices in a manner that reduces costs associated with the data storage while providing efficient data access.

In several conventional data storage environments, the decision where to store the data is generally manually determined by a user (e.g., a system administrator) of the data storage environment. The user may make the decision based upon data usage patterns and upon characteristics of the storage devices available in the storage environment for storing the data. Accordingly, in such environments, the system administrator has to gather frequency and data usage information, data access and performance requirements, and frequency of access information from users or consumers of the data. The administrator also has to determine characteristics (e.g., cost, capacity, other performance characteristics) of storage devices available for storing the data. The administrator then typically makes an educated guess as to where the data is to be stored. While the manual approach described above may be feasible in simple homogeneous storage environments supporting a small number of data consumers, such an approach is impractical for today's large and heterogeneous storage environments.

Presently, several conventional data management systems are available that automate part of the data storage decision making process. For example, automated data backup applications are available that perform hierarchical storage management (HSM) to move data from online to off-line storage (or primary to secondary backup media). However, conventional data management systems do not presently offer the flexibility, control, and automation desired by system administrators for managing large heterogeneous storage environments comprising a large number of data consumers, servers, and hosts.

In light of the above, there is a need for automated techniques that allow data storage administrators to efficiently manage distributed data and storage resources with minimum intervention in a manner the facilitates efficient data access while optimizing the use of available storage resources.

BRIEF SUMMARY OF THE INVENTION

Embodiments of the present invention provide automated techniques for determining storage locations for data in a storage environment based upon storage policies configured for the storage environment. The storage location is determined in a manner that enables efficient data access while optimizing the available storage resources with minimum human intervention. The storage locations are determined based upon characteristics associated with the data to be stored, based upon characteristics of the storage devices, and based upon storage policies configured for the storage environment.

According to an embodiment of the present invention, techniques are provided for a storage device for storing data in a storage environment comprising a plurality of storage devices. An embodiment of the present invention receives a signal to store a data file. The present invention embodiment then identifies a set of one or more placement rules configured for the storage environment, each placement rule comprising data-related criteria identifying one or more conditions related to one or more characteristics of the data to be stored and device-related criteria identifying one or more conditions related to one or more storage device characteristics. A data value score (DVS) is calculated for each placement rule in the set of placement rules based upon the data-related criteria of the placement rule and characteristics of the data file. The present invention embodiment then determines a storage device, from the plurality of storage devices, for storing the data file based upon the set of placement rules and their associated DVSs, characteristics of the plurality of storage devices, and characteristics of the data file to be stored.

The foregoing, together with other features, embodiments, and advantages of the present invention, will become more apparent when referring to the following specification, claims, and accompanying drawings.

BRIEF DESCRIPTION OF THE DRAWINGS

FIG. 3 depicts examples of placement rules according to an embodiment of the present invention;

DETAILED DESCRIPTION OF THE INVENTION

Embodiments of the present invention provide automated techniques for storing data in a data storage environment. According to an embodiment of the present invention, techniques are provided for determining storage locations for data in a heterogeneous storage environment based upon storage policies configured for the storage environment. Embodiments of the present invention thus facilitate storage of data in a manner that enables efficient data access while optimizing the use of available storage resources with minimum human intervention.

According to an embodiment of the present invention, a data management system coupled to a heterogeneous data storage environment is configured to automate data management and storage functions. In this embodiment, the data management system is configured to monitor and analyze data and storage resource usage patterns and determine optimal storage locations for the data based upon the usage patterns. The data management system is also configured to determine storage locations for the data based upon characteristics of the data and the storage devices and based upon storage policies configured for the storage environment. The storage policies may be configured by a user (e.g., an end-user, a system administrator, a manager, etc.) of the storage environment.

The embodiment of the present invention described below describes techniques for determining storage locations for data stored in the form of data files. It should however be understood that, in addition to data files, the teachings of the present invention may also be used to determine storage locations for other units of data such as block data. Accordingly, the embodiments of the present invention described below are not meant to limit the scope of the present invention.

Figure 1:
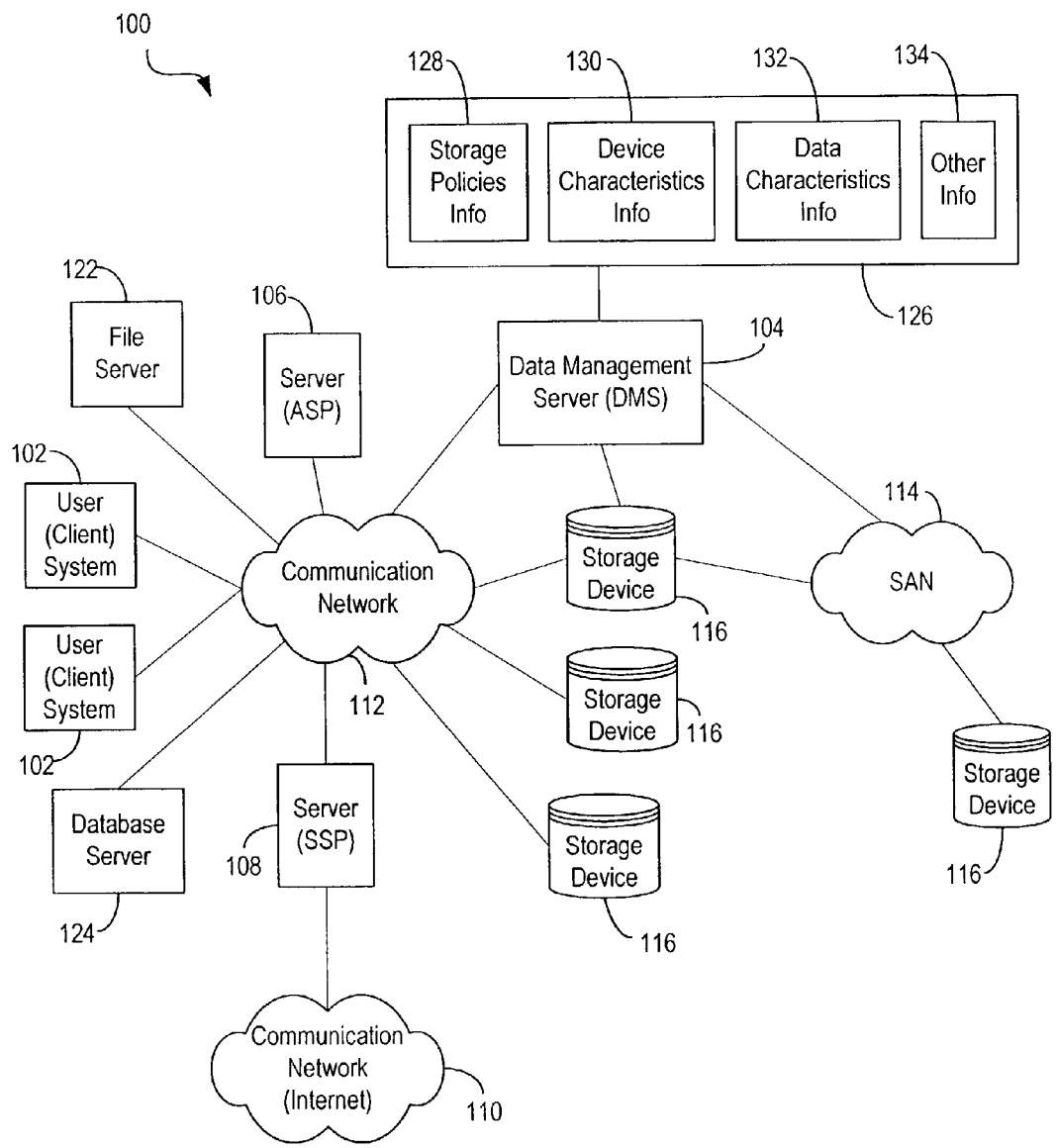
FIG. 1 is a simplified block diagram of a distributed system that may incorporate an embodiment of the present invention.

FIG. 1 is a simplified block diagram of a distributed system 100 that may incorporate an embodiment of the present invention. Distributed system 100 comprises a plurality of computer systems and storage devices coupled to one or more communication networks via a plurality of communication links. As depicted in FIG. 1, distributed system 100 comprises a plurality of computer systems including one or more user (client) systems 102 coupled to communication network 112, a plurality of server systems including a data management server (DMS) 104, an application service provider (ASP) server 106, a server 108 providing connectivity to a communication network 110 such as the Internet, a file server 122, a database server 124, and various other types of servers. Distributed computer network 100 depicted in FIG. 1 is merely illustrative of an embodiment incorporating the present invention and does not limit the scope of the invention as recited in the claims. One of ordinary skill in the art would recognize other variations, modifications, and alternatives.

The communication networks depicted in FIG. 1 such as communication networks 112 and 110 provide a mechanism for allowing communication and exchange of information between the various computer systems and storage devices depicted in FIG. 1. The communication networks may themselves be comprised of many interconnected computer systems and communication links. For example, communication network 112 may be a LAN (as depicted in FIG. 1), a wide area network (WAN), a wireless network, an Intranet, a private network, a public network, a switched network, or any other suitable communication network. Likewise, communication network 110 may also be any other communication network such as the Internet (as depicted in FIG. 1), or any other computer network.

The communication links used to connect the various systems depicted in FIG. 1 may be of various types including hardwire links, optical links, satellite or other wireless communications links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), Fiber Channel protocols, protocols under development by industry standard organizations, vendor-specific protocols, customized protocols, and others.

Computer systems connected to a distributed system such as system 100 depicted in FIG. 1 may be classified as "clients" or "servers" depending on the roles the computer systems play with respect to requesting information or a service or storing/providing information or a service. Computers systems that are used by users to configure information requests or service requests are typically referred to as "client" computers. Computer systems that receive information requests and/or service requests from client systems, perform processing required to satisfy the requests, and forward the results/information corresponding to the requests back to the requesting client systems are usually referred to as "server" systems. The processing required to satisfy a client request may be performed by a single server system or may alternatively be delegated to other servers. Accordingly, the server systems depicted in FIG. 1 are configured to provide information and/or provide a service requested by requests received from one or more client computers. It should however be understood that a particular computer system might function both as a server and a client.

Users of distributed system 100 may use user systems 102 to access data stored by one or more computer systems or storage devices depicted in FIG. 1. As depicted in FIG. 1, user systems 102 may be coupled to communication network 112 via one or more communication links. A user system 102 generally functions as a client requesting data and services from the server systems. A user may also interact with other systems depicted in FIG. 1 via user system 102. For example, a user may use client system 102 to interact with data management server 104. User systems 102 may be of different types including a personal computer, a portable computer, a workstation, a computer terminal, a network computer, a mainframe, a kiosk, a personal digital assistant (PDA), a communication device such as a cell phone, or any other data processing system.

Among the server systems depicted in FIG. 1, DMS 104 is configured to perform processing to provide automated techniques for determining storage locations for data in the storage environment depicted in FIG. 1. SSP server 108 is configured to provide access to communication network 110. File server 122 may be configured to manage directories and file systems. Database server 124 may be configured to store a database and process database queries. ASP server 106 may be configured to provide an application service.

As indicated above, according to an embodiment of the present invention, DMS 104 is configured to perform processing to automate data store and manage data in distributed system 100. The processing may be performed by software modules executed by DMS 104, by hardware modules coupled to DMS 104, or combinations thereof. According to an embodiment of the present invention, DMS 104 determines storage locations for the data based upon characteristics associated with the data to be stored, characteristics of storage devices available for storing the data, and based upon storage policies configured for the storage environment. The storage policies may be configured by a user (e.g., end-user, system administrator, manager, etc.) of the storage environment.

Information used by DMS 104 to perform processing according to the teachings of the present invention may be stored in a memory location accessible to DMS 104. For example, as depicted in FIG. 1, information related to the data, the storage devices, and the storage policies that is used by DMS 104 may be stored in a storage repository or database 126 accessible to DMS 104. As depicted in FIG. 1, the information stored in database 126 may include information related to one or more storage policies 128 that may be configured by a system administrator, device characteristics information 130, data characteristics information 132, and other information 134. Details related to storage policies information 128, device characteristics information 130, and data characteristics information 132 are provided below. The information may be stored in a single database as shown in FIG. 1, or may be stored in separate databases. It should be understood that the information might be stored in various other formats known to those skilled in the art. The information may be stored on storage devices such as memory drives, disks, tapes, in the memory of computer systems, or the like.

According to an embodiment of the present invention, distributed system 100 comprises a plurality of storage devices that can be used to store and/or backup data. As depicted in FIG. 1, the storage devices include various dedicated storage devices 116, one or more computer systems depicted in FIG. 1, devices included in storage networks such as storage area network (SAN) 114, network attached storage (NAS) (not shown), and others. Examples of storage devices include tapes, disk drives, optical disks, RAID structures, solid state storage, and other types of computer-readable storage media. In general, use of the term "storage device" is intended to refer to any system, subsystem, device, computer medium, network, or other like system or mechanism that is capable of storing data in digital or electronic form. The storage devices may be directly coupled to DMS 104, coupled to DMS 104 via a communication network such as communication network 112, coupled to DMS 104 via storage networks (e.g., storage area network (SAN) 114), and via other techniques.

As is known to those skilled in the art, storage devices may be characterized by the amount of time required to access data (referred to as "data access time") stored by the storage devices. For example, storage devices may be characterized as on-line storage devices, near-line storage devices, off-line storage devices, and others. The data access time for an on-line storage device is generally shorter than the access time for a near-line storage device. The access time for an off-line storage is generally longer than the access time for a near-line storage device. An off-line storage device is generally a device that is not readily accessible to DMS 104. Examples of off-line storage devices include computer-readable storage media such as tapes, optical devices, and the like. User interaction may be required to access data from an off-line storage device. For example, if a tape is used as an off-line device, the user may have to make the tape accessible to DMS 104 before data stored on the tape can be restored by DMS 104.

It should be understood that various other criteria might also be used to classify or characterize storage devices. It should be understood that classification of a storage device is not required by the present invention and should not be construed to limit the scope of the present invention as recited in the claims.

Figure 2:
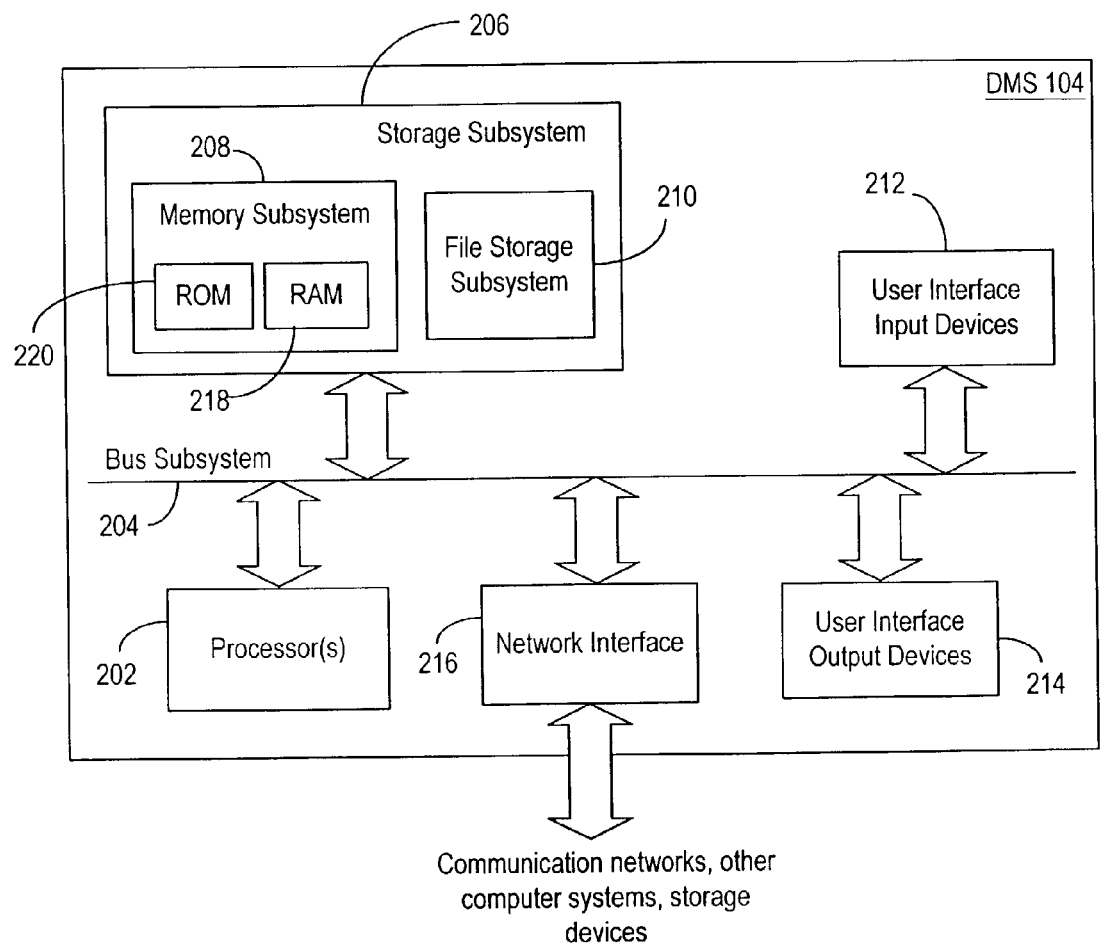
FIG. 2 is a simplified block diagram of a data management server according to an embodiment of the present invention.

As stated above, according to an embodiment of the present invention, DMS 104 is configured to perform processing to store and manage data according to the teachings of the present invention. FIG. 2 is a simplified block diagram of DMS 104 according to an embodiment of the present invention. As shown in FIG. 2, DMS 104 includes at least one processor 202, which communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216. The input and output devices allow user interaction with DMS 104. A user may be a human user, a device, a process, another computer, and the like.

Network interface subsystem 216 provides an interface to other computer systems, networks, and devices. Embodiments of network interface subsystem 216 include an Ethernet card, a modem (telephone, satellite, cable, ISDN, etc.), (asynchronous) digital subscriber line (DSL) units, and the like.

User interface input devices 212 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to DMS 104.

User interface output devices 214 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from DMS 104.

Storage subsystem 206 may be configured to store the basic programming and data constructs that provide the functionality of DMS 104. For example, according to an embodiment of the present invention, software modules implementing the functionality of the present invention may be stored in storage subsystem 206. These software modules may be executed by processor(s) 202. In a distributed environment, the software modules may be stored on a plurality of computer systems and executed by processors of the plurality of computer systems. Storage subsystem 206 may also provide a repository for storing data and various databases that may be used to store information according to the teachings of the present invention. For example, storage policies information 128, device characteristics information 130, and data characteristics information 132 may be stored in storage subsystem 206. Storage subsystem 206 may comprise memory subsystem 208 and file/disk storage subsystem 210.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media. One or more of the drives may be located at remote locations on other connected computers.

Bus subsystem 204 provides a mechanism for letting the various components and subsystems of DMS 104 communicate with each other as intended. The various subsystems and components of DMS 104 need not be at the same physical location but may be distributed at various locations within network 100. Although bus subsystem 204 is shown schematically as a single bus, alternative embodiments of the bus subsystem may utilize multiple busses.

DMS 104 itself can be of varying types including a personal computer, a portable computer, a workstation, a network computer, a mainframe, a kiosk, a personal digital assistant (PDA), a communication device such as a cell phone, or any other data processing system. Due to the ever-changing nature of computers and networks, the description of DMS 104 depicted in FIG. 2 is intended only as a specific example for purposes of illustrating the preferred embodiment of the computer system. For example, other types of processors are contemplated, such as the Athlon™ class microprocessors from AMD, the Pentium™-class or Celeron™-class microprocessors from Intel Corporation, PowerPCT™ G3 or G4 microprocessors from Motorola, Inc., Crusoe™ processors from Transmeta, Inc. and the like. Further, other types of operating systems are contemplated in alternative embodiments including WinidowsNT™ from Microsoft, Solaris from Sun Microsystems, LINUX, UNIX, MAC OS X from Apple Computer Corporation, and the like. Many other configurations having more or fewer components than the system depicted in FIG. 2 are possible.

As indicated above, according to the teachings of the present invention, DMS 104 determines locations for storing data in distributed network 100 based upon one or more storage policies configured for the storage environment, based upon information identifying characteristics of the data to be stored, and based upon information identifying characteristics of the storage devices available for storing the data in the storage environment.

According to an embodiment of the present invention, a storage policy specifies when and how data is to be stored and/or migrated. A storage policy may comprise one or more rules that may be configured by an administrator of the storage environment. These rules may include rules that specify when data is to be stored in the storage environment or when data is to be migrated from one storage location to another. The rules may also include rules specifying the storage location where the data is to be stored. The storage location may identify a storage device to be used for storing the data and may also identify where on the storage device (e.g., volume, directory, etc.) the data is to be stored.

According to an embodiment of the present invention, a storage policy includes one or more "placement rules" and "migration rules". A placement rule identifies the criteria to be used for selecting a storage device for storing the data. In one embodiment, each placement rule is implemented as an IF . . . THEN clause in the policy engine. This clause describes the conditions associated with the IF clause that need to be evaluated and the actions to be performed when the IF clause is satisfied. Various conditions and properties of the data (e.g., type of data, size of a data file, owner of the file, etc.) and of storage devices for storing the data (e.g., available capacity of a storage device, bandwidth capability of a storage device, cost of storing data on a storage device, etc.) may be specified in the IF clause. For purposes of this invention, the actions typically include storing data in a particular storage location or migrating data from a first storage location to another storage location.

A migration rule describes when one or more placement rules are to be evaluated. In one embodiment, each migration rule is implemented as a WHEN clause in the policy engine. The WHEN clause generally specifies one or more events (e.g., temporal events that change with time) that can be monitored by DMS 104. Examples of events that may be specified in a WHEN clause include: a data file is created, a data file is modified, usage of a storage volume exceeds or falls below a certain threshold, a time related event has occurred, and the like. A WHEN clause is satisfied or evaluates to TRUE when one or more events specified in the WHEN occur or evaluate to true.

Multiple events or conditions may be connected together in a WHEN clause or in an IF clause using one or more logical or Boolean operators. For example, Boolean operators such as AND, OR, NOT, and the like may be used. As described above, an IF clause is evaluated only when a WHEN clause evaluates to TRUE. Further details related to IF . . . THEN clauses and WHEN clauses are described in U.S. Provisional Patent Application No. 60/340,227 filed Dec. 14, 2001, and U.S. Non-Provisional patent application Ser. No. 10/133,123 filed Apr. 25, 2002, the entire contents of which are herein incorporated by reference for all purposes.

According to an embodiment of the present invention, the rules associated with a storage policy are evaluated when DMS 104 receives a signal to determine a storage location for some data such as a file being managed by DMS 104. The signal may be triggered manually by a user of the present invention or may be triggered in response to a signal received from another application or process. The storage policy rules may also be evaluated when files are to be selected for migration from one device to another while performing capacity balancing, for load balancing purposes, or for performing other storage management tasks such as increasing data and/or space availability. DMS 104 may perform capacity balancing in response to a signal triggered by a user of the storage environment in response to a signal received from another application or process.

According to an embodiment of the present invention, information such as device characteristics information 130 and data characteristics information 132 is used as input parameter for evaluating one or more storage rules specified by a storage policy. For example, device characteristics 130 and data characteristics 132 are used as inputs to evaluate the WHEN and IF . . . THEN clauses.

According to an embodiment of the present invention, device characteristics information 130 includes information related to storage devices available in the storage environment for storing data and other information. DMS 104 uses the device characteristics information 130 to evaluate rules defined in a storage policy to determine optimal locations for storing data. According to an embodiment of the present invention, device characteristics information 130 for a storage device may include:

(1) Available capacity information: This information indicates the available storage capacity of the storage device. This value is usually expressed as a percentage of the total storage capacity of the storage device. For example, if the total storage capacity of a storage device is 100 Mbytes, and if 40 Mbytes are free for storage (i.e., 60 Mbytes are already used), then the available capacity of the storage device may be expressed as 40% available. The value may also be expressed as the amount of free storage capacity (e.g., in Mbytes, GBytes, etc.) This information may be dynamically monitored and tracked by DMS 104 for a storage device by examining the actual usage of the storage device.

(2) Cost information: This information indicates the cost of storing data on a storage device. The cost may be measured as number of dollars per unit of memory (e.g., dollars-per-Gigabyte, dollars-per-Megabyte, etc). A system administrator or user of the present invention may configure this information.

(3) Supported bandwidth information: This information is usually measured as a unit of data per unit of time (e.g., Mbps→megabits-per-second, etc.) and expresses the bandwidth capability of a storage device. In alternative embodiments, qualitative classifications may also be used to represent this information. For example, supported bandwidth for a storage device may be classified as "high", "medium", or "low". Each qualitative classification may correspond to a range of preset unit-of-data per unit-of-time values. A system administrator or user of the present invention may configure this information.

(4) Desired threshold information: This information identifies one or more thresholds that may be configured by a system administrator or user for storing data on a device. For example, a system administrator may specify a storage capacity threshold for a device. Each threshold may be expressed as a percentage of the total capacity of the storage device. For a particular storage device, thresholds may also be defined for particular types of data to be stored on the device. Each threshold associated with a data type may indicate the percentage of total capacity of the device that the user desires to allocate for storing data of the particular type. For example, a user may configure that only up to 15% of the total capacity of a storage device may be used for storing MS Office files, or only up to 25% of the total capacity of the storage device capacity may be used for storing electronic mail data, etc.

(5) File size requirement: This information indicates the threshold size (either minimum threshold or maximum threshold) of a data file before the file can be stored on the storage device. For example, the file size requirement information may indicate that a file has to be at least a certain size before it can be stored on the device, or that any file above a particular size cannot be stored on the storage device, or the like. A user of the present invention may configure the file size requirement for a device.

(6) Availability characteristics. This is a qualitative value that represents the administrator's perception of the relative availability of the device (e.g., high, medium, or low). For example, the qualitative value may be set based upon the degree of replication of the device (e.g., RAID levels: RAID 10, RAID 5 is high, RAID 0, RAID 1 is medium etc). Other factors that may influence the availability characteristics include hardware availability features such as number of redundant power supplies, redundant controllers, multiple access paths to the device, etc.

It should be understood that various other types of information might also be included in device characteristics information 130 in alternative embodiments of the present invention. Further, in alternative embodiments of the present invention, device characteristics information 130 may include more information or less information than that described above.

A system administrator may also group one or more storage devices into volumes or volume groups. A volume may represent an identifiable unit of storage space based upon one or more storage devices. For example, storage devices that have the similar static characteristics may be grouped into a volume group or set. A storage device may also be divided into one or more separately identifiable volumes. It should be understood that information such as the available capacity information may be different for each volume (or storage device) in a volume group. Accordingly, each volume in a volume group may be individually monitored by DMS 104.

As indicated above, in addition to device characteristics information 130, data characteristics information 132 is also used as a parameter for evaluating one or more storage rules specified in a storage policy. According to an embodiment of the present invention, data characteristics information 132 includes information related to the data to be stored. For purposes of describing an embodiment of the present invention, it is assumed that the data is stored in the form of files ("data files"). It should be understood that in alternative embodiments of the present invention, various other techniques or methods may be used to store the data. According to an embodiment of the present invention, for each data file, data characteristics information 132 associated with the data file may include:

(1) Relevance of data information ("relevance score"): This information represents a value indicating a priority assigned by the administrator to the data file. For example, according to an embodiment of the present invention, the user or administrator may assign a number in the range of 0 and 1, with 0 being least important and 1 being most important. The relevance score can be assigned to any combination of file types and ownership, with a default relevance score used when the administrator makes no explicit assignment. For example, a content provider may assign a higher score to all JPEG files and files owned by the authoring group than to other files.

(2) File Size information: This indicates the size of a data file.

(3) File type information: This indicates the type of data stored by the data file. A data file may be of various different types. These types may be defined by a user of the storage environment or may alternatively be defined by the storage environment. Examples of file types include image files, email files, MS Office file, etc.

(4) File ownership information: This information indicates the owner of the data file. Generally, the creator of a data file is designated as the owner of the file.

(5) Data bandwidth requirement information: This information indicates the bandwidth requirement for a data file. This information is used for determining a storage location for the file. A user or system administrator of the storage environment generally configures this information.

(6) File access information: This information indicates the file access pattern associated with a data file. For example, this information may include information related to when a file was created or accessed, identity of the person accessing the file, last access time of the file, and other like information. This information may be automatically monitored by DMS 104.

(7) Current file location information: This information indicates the current location of the file.

It should be understood that various other types of information might also be included in data characteristics information 132 in alternative embodiments of the present invention. Further, in alternative embodiments of the present invention, data characteristics information 132 may include more information or less information than that described above.

A system administrator may also define data groups. Each data group may comprise one or more data files that share similar characteristics.

As indicated above, data characteristics information 132 and device characteristics information 130 serve as parameters to migration and placement rules defined according to a storage policy. As described above, a placement rule is evaluated only after conditions specified by a migration rule are satisfied. According to an embodiment of the present invention, each placement rule may comprise the following portions:

(1) Data usage criteria information
(2) File selection criteria information
(3) Location constraint criteria information The term "data-related criteria" may be used to refer to data use criteria information and file selection criteria information since they comprise conditions associated with the data to be stored. The term "device-related criteria" may be used to refer to local constraint information since it comprises conditions related to storage devices.

FIG. 3 depicts examples of placement rules according to an embodiment of the present invention. In FIG. 3, each row 308 of table 300 specifies a placement rule. Column 302 of table 300 identifies the file selection criteria information for each rule, column 304 of table 300 identifies the data usage criteria information for each placement rule, and column 306 of table 300 identifies the location constraint criteria information for each rule.

The "file selection criteria information" specifies information identifying a set of data files that is eligible for the specific placement rule. According to an embodiment of the present invention, the selection criteria information for a placement rules specifies one or more clauses (or conditions) related to a data characteristics parameter such as file type, relevance score of file, file owner, etc. Each clause may be expressed as an absolute value (e.g., File type is "Office files") or as an inequality (e.g., Relevance score of file $\geq 0.5$). Multiple clauses may be connected by Boolean connectors (e.g., File type is "Email files" AND File owner is "John Doe") to form a Boolean expression. The file selection criteria information may also be left empty (i.e., not configured or set to NULL value), e.g., file selection criteria for placement rules 308-6 and 308-7 depicted in FIG. 3. According to an embodiment of the present invention, the file selection criteria information defaults to a NULL value. An empty or NULL file selection criterion is valid and indicates that all files are selected or are eligible for the placement rule.

The "data usage criteria information" specifies criteria related to file access information associated with a data file. For example, for a particular placement rule, this information may specify a time (e.g., timestamp) associated with a data file that falls within specific date ranges. The timestamp can correspond to a creation date, the date a file was last modified, the date when a file was last accessed, and the like. The criteria may be specified using one or more clauses or conditions related to file access information connected using Boolean connectors. The data usage criteria clauses may be specified as equality conditions or inequality conditions. An example of data usage criteria is "file last accessed between 7 days to 30 days ago" (corresponding to placement rule 308-2 depicted in FIG. 3). The administrator or user of the present invention may set this criterion.

The "location constraint information" for a particular placement rule specifies one or more constraints that must be satisfied by a storage device selected for storing data based upon the particular placement rule. Accordingly, location constraint information generally specifies parameters associated with a storage device. The location constraint information may be left empty or may be set to NULL to indicate that no constraints are applicable to the placement rule (e.g., location constraint information corresponding to placement rule 308-3 depicted in FIG. 3). According to an embodiment of the present invention, the constraint information may be set to LOCAL (e.g., location constraint information for placement rules 308-1 and 308-6) which implies that data file will be stored on a local storage device (local to the device used to create the data file) and will not be moved or migrated to another storage device. A specific volume group, or a specific device may be specified in the location constraint information for storing the data file. A minimum bandwidth requirement (e.g., Bandwidth>=10 MB/s) may be specified indicating that the data can only be stored on a storage device satisfying the constraint. Various other constraints or requirements may also be specified (e.g., constraints related to file size, availability, etc.). The constraints specified by the location constraint information are generally hard constraints implying that a data file cannot be stored on a device that does not satisfy the location constraints.

Figure 4:
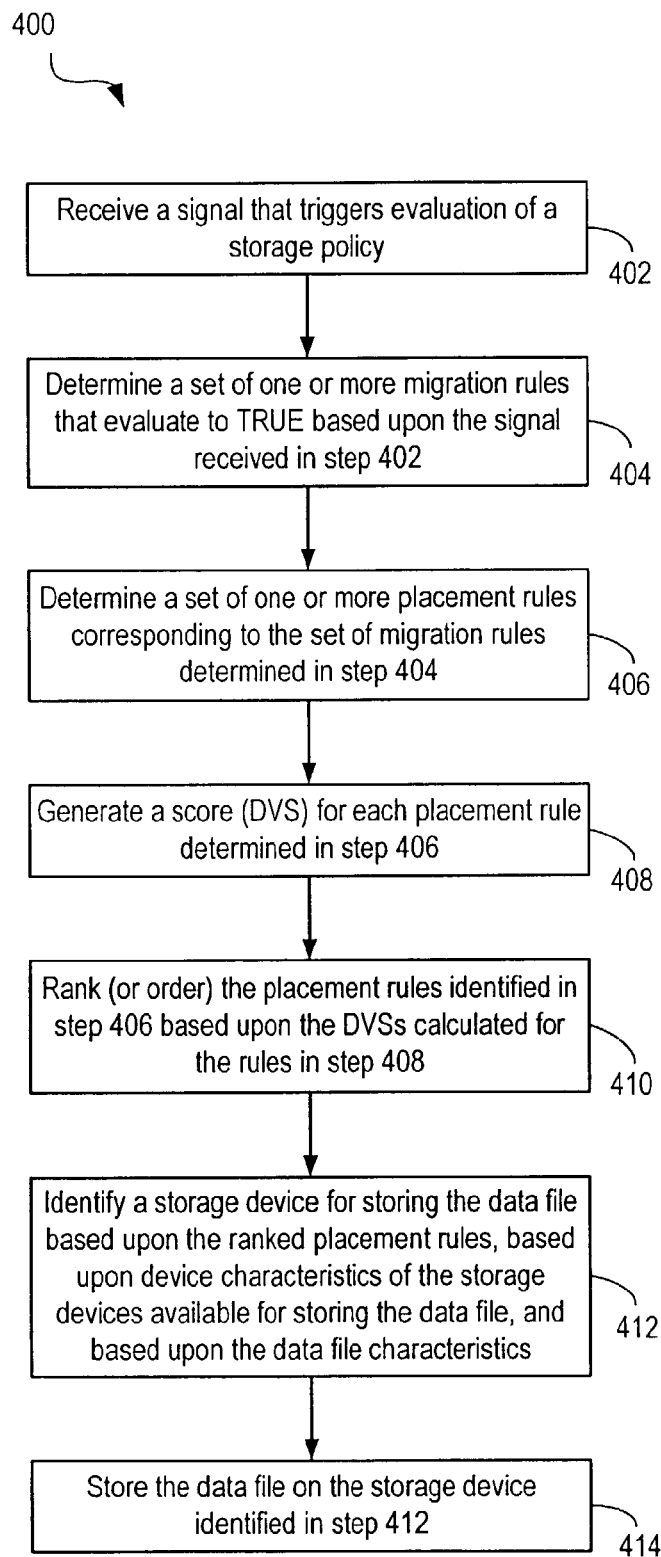
FIG. 4 is a simplified high-level flowchart depicting a method of selecting a storage device from a storage environment for storing a data file based upon a storage policy configured for the storage environment according to an embodiment of the present invention.

FIG. 4 is a simplified high-level flowchart 400 depicting a method of selecting a storage device from a storage environment for storing a data file based upon a storage policy configured for the storage environment according to an embodiment of the present invention. The method may be performed by DMS 104, or by DMS 104 in association with other data processing systems. In the embodiment described below the method is performed by DMS 104. The method may be performed by software modules executed by processor(s) 202 of DMS 104, or by hardware modules coupled to DMS 104, or combinations thereof. Flowchart 400 depicted in FIG. 4 is merely illustrative of an embodiment incorporating the present invention and does not limit the scope of the invention as recited in the claims. One of ordinary skill in the art would recognize variations, modifications, and alternatives.

As depicted in FIG. 4, processing is initiated when DMS 104 receives a signal that triggers evaluation of a storage policy (step 402). The signal may be automatically received from another system or application or may be manually generated by a user (e.g., a system administrator of the storage environment) of the present invention. Various different events may trigger generation of the signal. For example, the signal may be generated when a storage capacity threshold has been reached and/or one or more data files are to be stored in the storage environment. The signal may also be generated when one or more data files stored in the storage environment are to be relocated to another storage location within the storage environment. The signal may also be generated when a storage management application needs to migrate a set of data files from one storage location to another in order to free up storage capacity, perform capacity balancing, load balancing, or other storage management tasks. For purposes of explaining flowchart 400 depicted in FIG. 4, it is assumed that the signal is generated when a particular data file is to be stored in the storage environment depicted in FIG. 1.

Upon receiving the signal, DMS 104 determines a set of one or more migration rules that evaluate to TRUE based upon the signal received in step 402 (step 404). As indicated above, according to an embodiment of the present invention, each migration rule may be implemented as a WHEN clause. Accordingly, in step 404, DMS 104 determines a set of one or more WHEN clauses that evaluate to TRUE.

DMS 104 then determines a set of one or more placement rules, corresponding to the migration rules determined in step 404 (step 406). As previously described, each placement rule identifies criteria to be used for selecting a storage device for storing the particular data file.

DMS 104 then generates a score for each placement rule determined in step 406 (step 408). According to an embodiment of the present invention, a numerical score (referred to as the Data Value Score or DVS) is generated for each placement rule. For each placement rule, the DVS generated for the placement rule indicates the level of suitability or applicability of the placement rule for the data set (e.g., the data file) to be stored. The value of the DVS for a particular placement rule is based upon the characteristics of the data file to be stored. For example, according to an embodiment of the present invention, higher scores are generated for placement rules that are deemed more suitable or relevant to the data file to be stored.

Several different techniques may be used for generating a DVS for a placement rule. According to an embodiment of the present invention, the DVS for a placement rule is a simple product of a "file_selection_score" and a "data_usage_score", i.e., DVS=file_selection_score*data_usage_score In the above formula, it is assumed that the file_selection_score and the data_usage_score are equally weighed in the calculation of DVS. However, in alternative embodiments, differing weights may be allocated to the file_selection_score and the data_usage_score. According to an embodiment of the present invention, the value of DVS is in the range between 0 and 1 (both inclusive).

According to an embodiment of the present invention, the file_selection_score (also referred to as the "data characteristics score") for a placement rule is calculated based upon the file selection criteria information specified for the placement rule and the data_usage_score for the placement rule is calculated based upon the data usage criteria information specified for the placement rule. As described above, the file selection criteria information and the data usage criteria information specified for the placement rule may comprise one or more clauses involving one or more parameters connected by Boolean connectors (see FIG. 3). Accordingly, calculation of the file_selection_score involves calculating numerical values for the individual clauses that make up the file selection criteria information for the placement rule and then combining the individual clause scores to calculate the file_selection_score for the placement rule. Likewise, calculation of the data_usage_score involves calculating numerical values for the individual clauses that make up the data usage criteria information for the placement rule and then combining the individual clause scores to calculate the data_usage_score for the placement rule.

According to an embodiment of the present invention, the following rules are used to combine score generated for the individual clauses to calculate a file_selection_score or data_usage_score:

Rule 1: For an N-way AND operation (i.e., for N clauses connected by an AND connector), the resultant value is the sum of all the individual values (i.e., values calculated for the individual clauses) divided by N.

Rule 2: For an N-way OR operation (i.e., for N clauses connected by an OR connector), the resultant value is the largest value calculated for the N clauses.

Rule 3: According to an embodiment of the present invention, the file_selection_score and the data_usage_score are between 0 and 1 (both inclusive).

According to an embodiment of the present invention, the value for each clause specified in the file selection criteria is scored using the following guidelines:

(a) If a NULL (or empty) value is specified in the file selection criteria information then the NULL or empty value gets a score of 1. For example, the file_selection_score for placement rule 308-7 depicted in FIG. 3 is set to 1.

(b) For file type and ownership parameter evaluations, a score of 1 is assigned if the parameter criteria are met, else a score of 0 is assigned. For example, for placement rule 308-4 depicted in FIG. 3, if the data file to be stored is of type "Email Files", then a score of 1 is assigned for the clause, and the file_selection_score for placement rule 308-4 is also set to 1. However, if the data file to be stored is not an email file, then a score of 0 is assigned for the clause and accordingly the file_selection_score is also set to 0.

(c) If the clause involves an equality test of the "relevance score", the score for the clause is calculated using the following equations:

$RelScore_{Data}$=Relevance score of the data file (from the data characteristics for the file)

$RelScore_{Rule}$=Relevance score specified in the file selection criteria information Delta=abs($RelScore_{Data}$-$RelScore_{Rule}$)

Score=1-(Delta/$RelScore_{Rule}$)

The Score is reset to 0 if it is negative.

(d) If the clause involves an inequality test (i.e., using >, >=, < or <=) related to the "relevance score" (e.g., rule 308-5 in FIG. 3), the score for the clause is calculated using the following equations:

The Score is set to 1 if the parameter inequality is satisfied.

$RelScore_{Data}$=Relevance score of the data file (from the data characteristics for the file)

$RelScore_{Rule}$=Relevance score specified in the file selection criteria information Delta=abs($RelScore_{Data}$-$RelScore_{Rule}$)

Score=1-(Delta/$RelScore_{Rule}$)

The Score is reset to 0 if it is negative.

The file_selection_score is then calculated based on the individual scores for the clauses in the file selection criteria information using Rules 1, 2, and 3, as described above. The file_selection_score represents the degree of matching (or suitability) between the file selection criteria information for a particular placement rule and the data file to be stored.

It should be evident that various other techniques may also be used to calculate the file_selection_score in alternative embodiments of the present invention.

According to an embodiment of the present invention, the score for each clause specified in the data usage criteria information for a placement rule is scored using the following guidelines:

The score for the clause is set to 1 if the parameter condition of the clause is met.

$Date_{Data}$=Relevant date information in the data file.

$Date_{Rule}$=Relevant date information in the rule.

Delta=abs($Date_{Data}$-$Date_{Rule}$)

Score=1-(Delta/$Date_{Rule}$)

The Score is reset to 0 if it is negative.

If a date range is specified in the clause (e.g., last 7 days), the date range is converted back to the absolute date before the evaluation is made. The data_usage_score is then calculated based upon scores for the individual clauses specified in the file selection criteria information using Rules 1, 2, and 3, as described above. It should be evident that various other techniques may also be used to calculate the data_usage_score in alternative embodiments of the present invention. The data_usage_score represents the degree of matching (or suitability) between the data usage criteria information for a particular placement rule and the data file to be stored.

The DVS is then calculated based upon the file_selection_score and data_usage_score. The DVS for a placement rule thus quantifies the degree of matching (or suitability) between the conditions specified in the file selection criteria information and the data usage criteria information for the placement rule and the characteristics of the data file to be stored as described by the data characteristics information for the data file.

Referring back to FIG. 4, a DVS is calculated in step 408 for each placement rule determined in step 406 based upon the file_selection_score and the data_usage_score for the rule. It should be evident that various other techniques may also be used to calculate DVSs for placement rules in alternative embodiments of the present invention.

The placement rules are then ranked (or ordered) based upon the DVSs calculated for the rules in step 408 (step 410). As indicated above, a DVS generated for a placement rule indicates the suitability of the placement rule for the data file to be stored. For example, according to an embodiment of the present invention, higher scores are generated for placement rules that are deemed more suitable (or are more relevant) for the data file to be stored. Accordingly, the ranked list of placement rules generated in step 410 represents a list of placement rules ranked according to their suitability or relevancy to the data file to be stored.

Several different techniques may be used for ranking the placement rules. The rules are initially ranked based upon DVSs calculated for the placement rules. According to an embodiment of the present invention, if two or more placement rules have the same DVS value, then the following tie-breaking rules may be used:

(a) The placement rules are ranked based upon priorities assigned to the placement rules by a user (e.g., system administrator) of the storage environment.

(b) If the priorities are not set or are equal, then the total number of top level AND operations (i.e., number of clauses connected using AND connectors) used in calculating the file_selection_score and the data_usage_score for a placement rule are used as a tie-breaker. A particular placement rule having a greater number of AND operations that are used in calculating file_selection_score and data_usage_ score for the particular rule is ranked higher than another rule having a lesser number of AND operations. The rationale here is that a more specific configuration (indicated by a higher number of clauses connected using AND operations) of the file selection criteria and the data usage criteria is assumed to carry more weight than a general specification.

(c) If neither (a) nor (b) are able to break the tie between placement rules, some other criteria may be used to break the tie. For example, according to an embodiment of the present invention, the order in which the placement rules are encountered may be used to break the tie. In this embodiment, a placement rule that is encountered earlier is ranked higher than a subsequent placement rule. Various other criteria may also be used to break ties.

It should be evident that various other techniques may also be used to rank the placement rules in alternative embodiments of the present invention.

Referring back to FIG. 4, DMS 104 then identifies a storage device for storing the data file based upon the ranked placement rules, based upon data characteristics associated with the particular data file to be stored, and based upon device characteristics associated with storage devices in the storage environment that are available for storing the data file (step 412). The storage device selected in step 412 represents a storage device that is optimal or well suited for storing the data file given the characteristics of the data file, the available storage devices, and the storage policy configured for the storage environment by a system administrator. Further details related to processing performed in step 412 according to an embodiment of the present invention are described below. The data file is then stored on the storage device identified in step 412 (step 414).

Figure 5A:
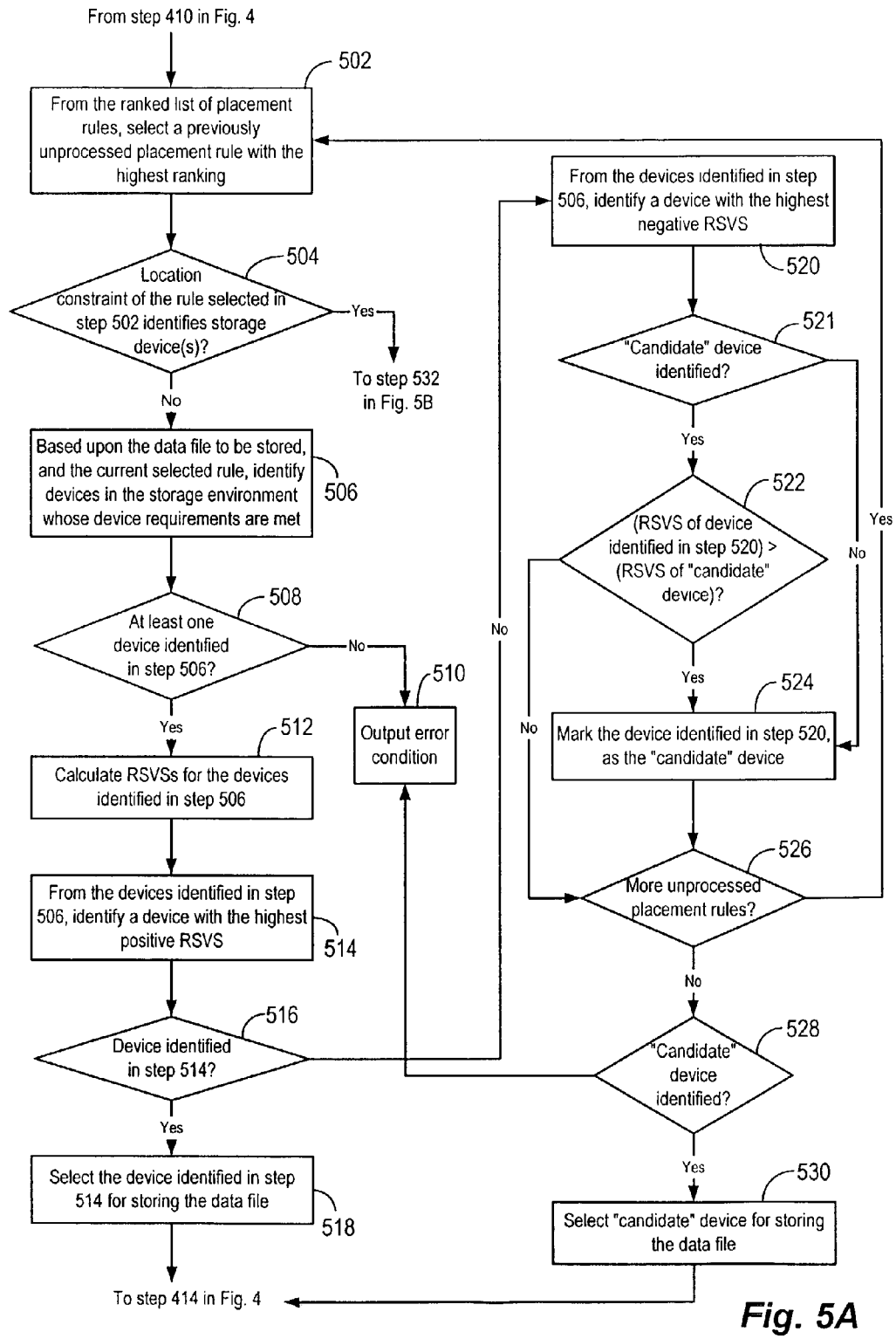
FIGS. 5A and 5B depict a simplified high-level flowchart showing processing performed for identifying a storage device for storing the data file based upon the ranked placement rules and based upon characteristics of the storage devices and the data file according to an embodiment of the present invention.
Figure 5B:
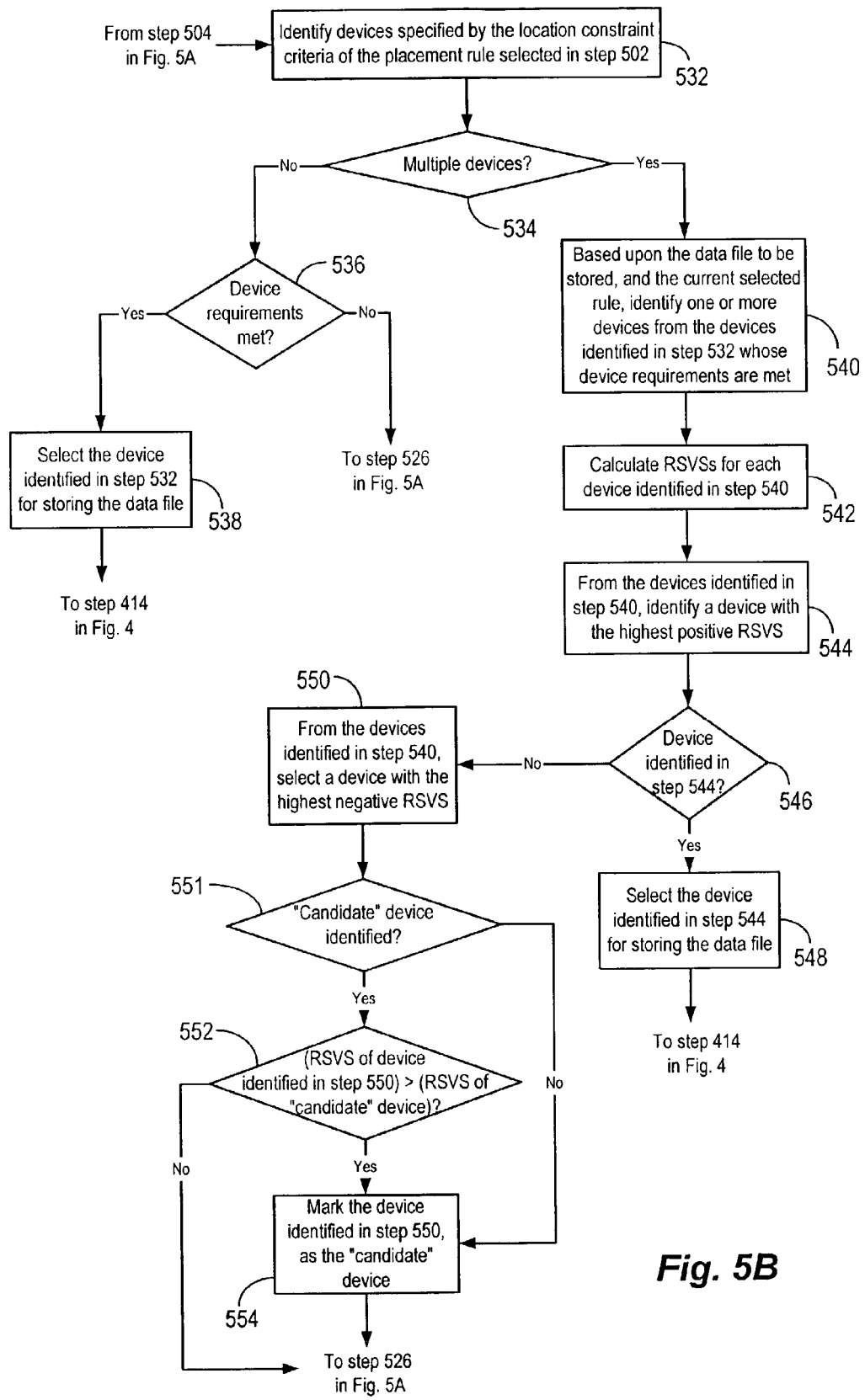

FIGS. 5A and 5B depict a simplified high-level flowchart 500 showing processing performed in step 412 of FIG. 4 for identifying a storage device for storing the data file based upon the ranked placement rules and based upon characteristics of the storage devices and the data file according to an embodiment of the present invention. The method may be performed by DMS 104, or by DMS 104 in association with other data processing systems. In the embodiment described below the method is performed by DMS 104. The method may be performed by software modules executed by processor(s) 202 of DMS 104, or by hardware modules coupled to DMS 104, or combinations thereof. Flowchart 500 depicted in FIGS. 5A and 5B is merely illustrative of an embodiment incorporating the present invention and does not limit the scope of the invention as recited in the claims. One of ordinary skill in the art would recognize variations, modifications, and alternatives.

As depicted in FIG. 5A, after the placement rules have been ranked according to step 410 in FIG. 4, DMS 104 selects a previously unprocessed placement rule (i.e., a placement rule that has not already been selected in step 502) with the highest ranking from the ranked list of placement rules (step 502). For example, during the first pass through the flowchart, the highest ranked placement rule is selected, during the second pass the second highest ranked placement rule is selected (since the highest ranked placement rule has been previously processed), during the third pass the third highest ranked placement rule is selected (since the highest and second highest ranked placement rules have been previously processed), and so on.

DMS 104 then determines if the location constraint criteria information for the placement rule selected in step 502 specifically identifies one or more storage devices for storing the data file (step 504). If the location constraint information identifies one or more storage devices, then processing continues with step 532 depicted in FIG. 5B and explained below. If the location constraint information does not specifically identify any storage devices for storing the data file, then based upon the characteristics of the data file to be stored, and the current rule selected in step 502, DMS 104 identifies a set of one or more storage devices whose device requirements are met (step 506). As previously described, according to an embodiment of the present invention, the device requirements for a storage device may be specified in the device characteristics information associated with the storage device. For example, the device characteristics information for a particular storage device may indicate a file size requirement indicating the threshold size of a data file before the file can be stored on the particular storage device, and the like. Accordingly, in step 506, the particular device is selected only if the size of the data file to be stored is above the threshold size indicated by the file size requirement information for the particular storage device. Other device requirements may likewise be evaluated.

DMS 104 then determines if at least one storage device was identified in step 506 (step 508). If it is determined in step 508 that not even one storage device was identified in step 506, it indicates that the data file does not satisfy the device requirements for any storage device in the storage environment. In this case, an error message may be output (step 510) to the user indicating that the device requirements for the storage devices are not satisfied by the data file. The user may then take appropriate action such as manually selecting a storage device for storing the file (even though the device requirements for the selected device are not satisfied.)

If it is determined in step 508 that at least one storage device was identified in step 506, DMS 104 then calculates a relative storage value score (RSVS) for each storage device identified in step 506 (step 512). According to an embodiment of the present invention, a RSVS for a device is calculated using the following steps:

STEP 1: A "Bandwidth_factor" variable is set to zero (0) if the bandwidth supported by the storage device (indicated by the supported bandwidth information included in the device characteristics information for the device) is less than the bandwidth requirement, if any, specified in the location constraints criteria specified for the placement rule selected in step 502. For example, the location constraint criteria for placement rule 308-2 depicted in FIG. 3 specifies that the bandwidth of the storage device should be greater than 40 MB. Accordingly, if the bandwidth supported by the storage device is less than 40 MB, then the "Bandwidth_factor" variable is set to 0.

Otherwise, the value of "Bandwidth_factor" is set as follows:

Bandwidth_factor=((Bandwidth supported by the device)−(Bandwidth required by the location constraint of the selected placement rule))+$K$ where K is set to some constant integer.

According to an embodiment of the present invention, K is set to 1. Accordingly, the value of Bandwidth_factor is set to a non-negative value.

STEP 2: RSVS is calculated as follows:

RSVS=Bandwidth_factor*(desired_threshold_%−current_usage_%)/cost

As described above, the desired_threshold_% for a storage device is usually set by a system administrator and included in the device characteristics information. The current_usage_% value is monitored by DMS 104 and also included in the device characteristics information. The "cost" value may be set by the system administrator and included in the device characteristics information.

It should be understood that the formula for calculating RSVS shown above is representative of one embodiment of the present invention and is not meant to reduce the scope of the present invention. Various other factors may be used for calculating the RSVS in alternative embodiments of the present invention. For example, the availability of a storage device may also be used to determine RSVS for the device. According to an embodiment of the present invention, availability of a storage device indicates the amount of time that the storage device s available during those time periods when it is expected to be available. Availability may be measured as a percentage of an elapsed year in certain embodiments. For example, 99.95% availability equates to 4.38 hours of downtime in a year (0.0005*365*24=4.38) for a storage device that is expected to be available all the time. According to an embodiment of the present invention, the value of RSVS for a storage device is directly proportional to the availability of the storage device.

STEP 3: Various adjustments may be made to the RSVS calculated according to the above steps. For example, in some storage environments, the administrator may want to group "similar" files together in one storage device. In other environments, the administrator may want to distribute files among different storage devices. The RSVS may be adjusted to accommodate the policy adopted by the administrator. Performance characteristics associated with a network that is used to transfer data from the storage devices may also be used to adjust the RSVSs for the storage devices. For example, the access time (i.e., the time required to provide data stored on a storage device to a user) of a storage device may be used to adjust the RSVS for the storage device. The throughput of a storage device may also be used to adjust the RSVS value for the storage device. Accordingly, parameters such as the location of the storage device, location of the data source, and other network related parameters might also be used to generate RSVSs. According to an embodiment of the present invention, the RSVS value is calculated such that it is directly proportional to the desirability of the device for storing the specific data file.

According to an embodiment of the present invention, based upon the steps described above, a higher RSVS value represents a more desirable storage device for storing the data file. As indicated, the RSVS value is directly proportional to the available capacity percentage. Accordingly, a device with higher available capacity is more desirable for storing the data file. The RSVS value is inversely proportional to the cost of storing data on the storage device. Accordingly, a storage device with lower storage costs is more desirable for storing the data file. The RSVS value is directly proportional to the bandwidth requirement. Accordingly, a device supporting a higher bandwidth is more desirable for storing the data file. RSVS is zero if the bandwidth requirements are not satisfied. Accordingly, the RSVS formula for a particular storage device combines the various device characteristics to generate a score that represents the degree of desirability of storing data on the particular storage device.

According to the above formula, RSVS is zero (0) if the value of Bandwidth_factor is zero. As described above, Bandwidth_factor is set to zero if the bandwidth supported by the storage device (indicated by the supported bandwidth information included in the device characteristics information for the device) is less than the bandwidth requirement, if any, specified in the location constraints criteria information specified for the selected placement rule. Accordingly, if the value of RSVS for a particular storage device is zero (0) it implies that bandwidth supported by the storage device is less than the bandwidth required by the placement rule, or the device is already at or exceeds the desired capacity threshold.

Alternatively, RSVS is zero (0) if the desired_threshold_% is equal to the current_usage_%.

If the RSVS for a device is positive, it indicates that the device meets both the bandwidth requirements (i.e., Bandwidth_factor is non zero) and also has enough capacity for storing the data file (i.e., desired_threshold_% is greater than the current_usage_%). The higher the RSVS value, the more suitable (or desirable) the device is for storing the data file. For devices with positive RSVSs, the device with the highest positive RSVS is the most desirable candidate for storing the data file. The RSVS for a particular device thus provides a measure for determining the degree of desirability for storing data on the particular device relative to other storage devices for the particular placement rule being processed. The RSVS in conjunction with the placement rules and their rankings is used to determine an optimal storage location for storing the data file.

The RSVS for a particular device may be negative when the device meets the bandwidth requirements but the device's usage is above the intended threshold (i.e., current_usage_% is greater than the desired_threshold_%). The relative magnitude of the negative value indicates the degree of over-capacity of the device. For devices with negative RSVSs, the closer the RSVS is to zero (0) and the device has capacity for storing the data, the more desirable the device is for storing the data file. For example, the over-capacity of a device having RSVS of –0.9 is more than the over-capacity of a second device having RSVS –0.1. Accordingly, the second device is a more attractive candidate for storing the data file as compared to the first device. Accordingly, the RSVS, even if negative, can be used in ranking the storage devices relative to each other for purposes of storing the data file.

The RSVS for a particular device thus serves as a measure for determining the degree of desirability or suitability of the particular device for storing the data file relative to other storage devices. A device having a positive RSVS value is a better candidate for storing the data file than a device with a negative RSVS value, since a positive value indicates that the storage device meets the bandwidth requirements for the data file and also possesses sufficient capacity for storing the data file. Among storage devices with positive RSVS values, a device with a higher positive RSVS is a more desirable candidate for storing the data file than a device with a lower RSVS value, i.e., the storage device having the highest positive RSVS value is the most desirable device for storing the data file.

If a storage device with a positive RSVS value is not available, then devices with negative RSVS values are more desirable than devices with an RSVS value of zero (0). The rationale here is that it is better to select a device that satisfies the bandwidth requirements (although the device is over capacity) than a device that does not meet the bandwidth requirements (i.e., has a RSVS of zero). Among devices with negative RSVS values, a device with a higher RSVS value (i.e., RSVS closer to 0) is a more desirable candidate for storing the data file than a device with a lesser RSVS value. Accordingly, among devices with negative RSVS values, the device with the highest RSVS value (i.e., RSVS closest to 0) is the most desirable candidate for storing the data file.

Referring back to FIG. 5A, after an RSVS has been generated for each storage device identified in step 506, DMS 104 then identifies, from the devices identified in step 506, a storage device with the highest positive RSVS value (step 514). As described above, the storage device with the highest positive RSVS value is the most suitable device for storing the data file for the placement rule selected in step 502.

DMS 104 then determines if a storage device was identified in step 514 (step 516). If a storage device was identified in step 514, then the device identified in step 514 is selected for storing the data file (step 518). Processing then continues with step 414 in FIG. 4 wherein the data file is stored on the device selected in step 518.

If it is determined in step 516 that no device was identified in step 514, it indicates that none of the devices selected in step 506 have a positive RSVS value, which implies that the one or more devices selected in step 506 have a negative or a zero RSVS value. In this scenario, DMS 104 then determines, from the devices identified in step 506, a storage device with the highest (i.e., closest to zero) negative RSVS value (step 520). As described above, among storage devices with negative RSVS values, the device with the highest negative RSVS value (i.e., RSVS closest to 0) is the most suitable candidate for storing the data file.

DMS 104 then determines if a "candidate" device has been previously identified (step 521). If a candidate device has been previously identified, DMS 104 then determines if the RSVS value of the storage device identified in step 520 is greater (i.e., closer to zero) than the RSVS value of the previously identified "candidate" device (step 522). If it is determined in step 522 that the RSVS value of the storage device identified in step 520 is greater than the RSVS value of the previously identified "candidate" device, it implies that storage device identified in step 520 is a better candidate for storing the data file than the previously identified "candidate" device and accordingly the storage device identified in step 520 is marked as the "candidate" device (step 524). Processing then continues with step 526.

If it is determined in step 521 that no candidate device has been previously identified, then processing continues with step 524 wherein the storage device identified in step 520 is marked as the "candidate" device. If it is determined in step 522 that the RSVS value of the storage device identified in step 520 is not greater than the RSVS value of the previously identified "candidate" device, then processing continues with step 526.

In step 526, DMS 104 determines if all the placement rules in the ranked list of placement rules have been processed (step 526). If it is determined that all the placement rules have not been processed, processing continues with step 502 wherein an unprocessed placement rule with the highest ranking is selected for processing.

If it is determined that all the placement rules in the ranked list have been processed and a suitable storage device has not yet been selected for storing the data file, DMS 104 then determines if a candidate device has been identified (step 528). If a candidate device has been identified, the candidate device is then selected for storing the data file (step 530). Processing then continues with step 414 in FIG. 4 wherein the data file is stored on the candidate device selected in step 530.

If it is determined in step 528 that no candidate device has been identified, then an error message is output to the user (step 510) indicating that a storage device could not be automatically selected for storing the data file based upon the placement rules, data file characteristics, and storage device characteristics. The user may then take appropriate actions such as manually selecting a storage device for storing the data file.

Referring back to step 504, if the location constraint information of the placement rule selected in step 502 specifically identifies one or more devices for storing the data file, then processing continues with step 532 depicted in FIG. 5B. There are various ways in which one or more storage devices for storing the data file may be specified in the location constraint information associated with the placement rule. For example, the location constraint information may identify a volume group comprising multiple volumes spanning one or multiple storage devices for storing the data file. For example, the location constraint information associated with placement rule 308-4 depicted in FIG. 3 specifies that the data file is to be stored on a storage device corresponding to a volume included in the volume group "New_volumes".

Referring to FIG. 5B, upon determining that the location constraint information of the placement rule selected in step 502 specifically identifies one or more devices for storing the data file, DMS 104 then identifies the devices specified by the location constraint information (step 532). For example, DMS 104 may identify all the storage devices corresponding to volumes included in a volume group specified in the location constraint information.

DMS 104 then determines if the location constraint specifies a single device or multiple devices (step 534). If it is determined in step 534 that only a single storage device has been specified, DMS 104 then determines if the device requirements of the single specified device are met (step 536). As previously described, device requirements for a device may be specified in the device characteristics information for the device. For example, the device characteristics information for a particular device may indicate a file size requirement indicating the threshold size of a data file before the file can be stored on the particular storage device, or the maximum file size of the type of the file.

If it is determined in step 536 that the device requirements for the single device specified in the location constraint information of the placement rule are satisfied, the single storage device is selected for storing the data file (step 538). Processing then continues with step 414 in FIG. 4 wherein the data file is stored on the single storage device selected in step 538. If it is determined in step 536 that the device requirements are not satisfied, then processing continues with step 526 depicted in FIG. 5A.

If it is determined in step 534 that multiple storage devices are specified by the location constraint information (e.g., devices corresponding to volumes belonging to a volume group) of the placement rule, DMS 104 then, based upon the characteristics of the data file to be stored and the placement rule, identifies a set of one or more storage devices from the multiple devices specified by the location constraint information whose device requirements are met (step 540). DMS 104 then calculates a RSVS for each storage device identified in step 540 (step 542). According to an embodiment of the present invention, the RSVSs are calculated according to the steps described above.

DMS 104 then identifies, from the storage devices identified in step 540, a storage device with the highest positive RSVS value (step 544). As described above, the storage device with the highest positive RSVS value is the most suitable storage device for storing the data file for the placement rule selected in step 502.

DMS 104 then determines if a storage device was identified in step 544 (step 546). If a storage device was identified in step 544, then the storage device identified in step 544 is selected for storing the data file (step 548). Processing then continues with step 414 in FIG. 4 wherein the data file is stored on the storage device selected in step 548.

If it is determined in step 546 that no storage device was identified in step 544, it indicates that none of the devices selected in step 540 have a positive RSVS value (i.e., the one or more devices selected in step 540 have a negative or a zero RSVS value). DMS 104 then determines, from the storage devices identified in step 540, a storage device with the highest (i.e., closest to zero) negative RSVS value (step 550). As described above, among devices with negative RSVS values, the device with the highest RSVS value (i.e., RSVS closest to 0) is the most suitable device for storing the data file.

DMS 104 then determines if a "candidate" device has been previously identified (step 551). If a candidate device has been identified, DMS 104 then determines if the RSVS value of the storage device identified in step 550 is greater (i.e., closer to 0) than the RSVS value of the previously identified "candidate" device (step 552). If it is determined in step 552 that the RSVS value of the storage device identified in step 550 is greater (i.e., closer to zero) than the RSVS value of the previously identified "candidate" device, then the storage device identified in step 550 is marked as the "candidate" device (step 554). Processing then continues with step 526 depicted in FIG. 5A.

If it is determined in step 551 that no candidate device has been identified, then processing continues with step 554 wherein the storage device identified in step 550 is marked as the "candidate" device. If it is determined in step 552 that the RSVS value of the storage device identified in step 550 is not greater than the RSVS value of the previously identified "candidate" device, then processing continues with step 526 depicted in FIG. 5A.

In the embodiment of the present invention described above, DMS 104 iterates through the ranked placement rules to identify a suitable placement rule and a corresponding suitable storage device for storing the data file. The present invention describes techniques for determining storage locations for data in a heterogeneous storage environment based upon storage policies configured for the storage environment such that the storage locations enable efficient data access while optimizing the available storage resources with minimum human intervention.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. Even though the embodiment described above discusses the use of bandwidths as a factor in calculating RSVS, other factors such as availability of the storage devices may also be used to calculate RSVSs according to other embodiments of the present invention. It should be understood that the equations described above are only illustrative of an embodiment of the present invention and can vary in alternative embodiments of the present invention.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a storage environment comprising a plurality of storage devices, a method of identifying a storage device from the plurality of storage devices for storing data, the method comprising:

receiving a signal to store a data unit;

identifying a set of one or more placement rules configured for the storage environment, each placement rule identifying criteria to be used for selecting a storage device for storing data, the criteria comprising data-related criteria and device-related criteria, the data-related criteria identifying one or more conditions related to one or more characteristics of the data to be stored and the device-related criteria identifying one or more conditions related to one or more storage device characteristics;

calculating a data value score (DVS) for each placement rule in the set of placement rules based upon the data-related criteria of the placement rule and characteristics of the data unit to be stored, wherein the DVSs calculated for the set of placements rules are used to select a placement rule from the set of placement rules to be used for determining a storage device for storing the data unit; and determining a storage device, from the plurality of storage devices, for storing the data unit based upon the set of placement rules and their associated DVSs, characteristics of the plurality of storage devices, and characteristics of the data unit to be stored.

2. The method of claim 1 wherein the DVS for a placement rule provides a measure of a degree of matching between the one or more conditions specified in the data-related criteria of the placement rule and the characteristics of the data unit to be stored.

3. The method of claim 1 wherein:

the data-related criteria for a placement rule comprises:

usage criteria comprising one or more conditions related to access information associated with a data unit; and unit selection criteria comprising one or more conditions related to characteristics of a data unit; and calculating a data value score (DVS) for each placement rule in the set of placement rules comprises:

generating a usage score for the placement rule based upon the usage criteria for the placement rule and access information associated with the data unit to be stored;

generating a unit selection score for the placement rule based upon the unit selection criteria for the placement rule and characteristics of the data unit to be stored; and generating the DVS for the placement rule based upon the usage score and the unit selection score.

4. The method of claim 1 wherein determining the storage device from the plurality of storage devices for storing the data unit comprises:

selecting a first placement rule from the set of placement rules based upon the DVSs associated with the set of placement rules;

calculating a relative storage value score (RSVS) for each storage device in the plurality of storage devices based upon the device-related criteria of the first placement rule, the characteristics of the data unit, and characteristics of the storage device; and selecting a storage device from the plurality of storage devices for storing the data unit based upon the RSVSs calculated for the plurality of storage devices.

5. The method of claim 4 wherein the RSVS for a storage device is directly proportional to the bandwidth supported by the storage device, directly proportional to the extent to which the storage device can store data without exceeding a threshold capacity, and inversely proportional to cost of storing data on the storage device.

6. The method of claim 5 wherein the RSVS for a storage device is directly proportional to availability of the storage device.

7. The method of claim 5 wherein selecting a storage device from the plurality of storage devices for storing the data unit based upon the RSVSs calculated for the plurality of storage devices comprises:

selecting, from the plurality of storage devices, a storage device having the highest RSVS value.

8. The method of claim 4 wherein the RSVS calculated for a storage device indicates whether the storage device can support a device bandwidth value specified in the device-related criteria of the first placement rule.

9. The method of claim 4 wherein the RSVS calculated for a storage device indicates whether the storage device can store the data unit without exceeding a capacity threshold associated with the storage device.

10. The method of claim 4 wherein selecting the first placement rule comprises selecting a placement rule with the highest DVS as the first placement rule.

11. The method of claim 10 wherein selecting a placement rule with the highest DVS comprises:

if the highest DVS is associated with multiple placement rules, using tie-breaking rules to select a placement rule from the multiple placement rules as the first placement rule.

12. The method of claim 1 wherein determining the storage device for storing the data unit comprises:

based upon DVSs calculated for the set of placement rules, selecting a first placement rule from the plurality of placement rules;

identifying a first set of storage devices from the plurality of storage devices based upon the device-related criteria of the first placement rule;

generating, for each storage device in the first set of storage devices, a relative storage value score (RSVS) based upon the device-related criteria of the first placement rule, characteristics of the data unit, and characteristics of the storage device; and selecting a storage device from the plurality of storage devices for storing the data unit based upon the RSVSs calculated for the plurality of storage devices.

13. The method of claim 12 wherein:

the RSVS for a storage device is calculated based upon bandwidth supported by the storage device, device bandwidth value specified in the device-related criteria of the first placement rule;

desired threshold capacity configured for the storage device, the desired threshold capacity indicating a portion of total capacity of the device allocated for storing the data unit, and current usage information for the storage device, the current usage information indicates a portion of the storage device that is being used for storing data of a particular type, and cost of storing data on the storage device; and generating a RSVS for each storage device in the first set of storage devices comprises:

generating a RSVS having a value of zero if the storage device is not capable of satisfying the bandwidth requirements specified by the first placement rule;

generating a RSVS having a value greater than zero if the storage device is capable of satisfying the bandwidth requirements specified by the first placement rule and can store the data unit without exceeding a capacity threshold associated with the storage device; and generating a RSVS having a value less than zero if the storage device is capable of satisfying the bandwidth requirements specified by the first placement rule and cannot store the data unit without exceeding a capacity threshold associated with the storage device.

14. The method of claim 13 wherein selecting a storage device from the first set for storing the data unit comprises selecting a device with the highest RSVS.

15. The method of claim 1 wherein:

the DVS for a placement rule indicates a degree of relevancy of the placement rule to the data unit to be stored; and determining a storage device from the plurality of storage devices for storing the data unit comprises:

(a) selecting a placement rule having a DVS indicating the highest degree of relevancy;

(b) identifying a first set of storage devices from the plurality of devices based upon the selected placement rule;

(c) generating a relative storage value score (RSVS) for each storage device in the first set of storage devices based upon the device-related criteria of the first placement rule, characteristics of the data unit, and characteristics of the storage device, the RSVS for a storage device indicating whether the storage device can satisfy bandwidth requirements specified by the selected placement rule and indicating if the storage device can store the data unit without exceeding a capacity threshold associated with the storage device;

(d) determining if at least one storage device in the first set of storage devices is capable of satisfying the bandwidth requirements specified by the selected placement rule and can store the data unit without exceeding a capacity threshold associated with the storage device;

(e) if it is determined that at least one storage device in the first set of storage devices is capable of satisfying the bandwidth requirements specified by the selected placement rule and can store the data unit without exceeding a capacity threshold associated with the storage device, selecting, based upon RSVSs generated for the storage devices, a storage device that is capable of satisfying the bandwidth requirements specified by the selected placement rule and can store the data unit without exceeding a capacity threshold associated with the storage device;

(f) if no storage device in the first set of devices is capable of satisfying the bandwidth requirements specified by the selected placement rule and can store the data unit without exceeding a capacity threshold associated with the storage device, selecting another placement rule from the set of placement rules that has a DVS indicating the next highest degree of relevancy; and (g) iterating step (b) through (f) until a storage device is identified for storing the data unit that is capable of satisfying the bandwidth requirements specified by the first placement rule and can store the data unit without exceeding a capacity threshold associated with the storage device.

16. The method of claim 1 wherein:

the DVS for a placement rule indicates a degree of relevancy of the placement rule to the data unit to be stored; and determining a storage device from the plurality of storage devices for storing the data unit comprises:

(a) selecting a placement rule having a DVS indicating the highest degree of relevancy;

(b) identifying a first set of storage devices from the plurality of devices based upon the selected placement rule;

(c) generating a relative storage value score (RSVS) for each storage device in the first set of storage devices based upon the device-related criteria of the first placement rule, characteristics of the data unit, and characteristics of the storage device, the RSVS for a storage device indicating a degree of desirability of storing the data unit on the storage device, the RSVS for a storage device indicating whether the storage device can satisfy bandwidth requirements specified by the selected placement rule and indicating if the storage device can store the data unit without exceeding a capacity threshold associated with the storage device;

(d) determining if at least one storage device in the first set of storage devices is capable of satisfying the bandwidth requirements specified by the selected placement rule and can store the data unit without exceeding a capacity threshold associated with the storage device;

(e) if it is determined that at least one storage device in the first set of storage devices is capable of satisfying the bandwidth requirements specified by the selected placement rule and can store the data unit without exceeding a capacity threshold associated with the storage device, selecting, based upon RSVSs generated for the storage devices, a storage device that is capable of satisfying the bandwidth requirements specified by the selected placement rule and can store the data unit without exceeding a capacity threshold associated with the storage device;

(f) if no storage device in the first set of devices is capable of satisfying the bandwidth requirements specified by the selected placement rule and can store the data unit without exceeding a capacity threshold associated with the storage device:

determining a first storage device from the first set of storage devices that can store the storage unit and is more desirable for storing the data unit than other devices in the first set of storage devices as indicated by the RSVSs generated for the devices;

determining if a storage device has been identified as a candidate device;

if a storage device has been marked as a candidate device:

if the first storage device is more desirable for storing the data unit than the marked candidate device as indicated by the RSVSs associated with the first device and the marked candidate device, marking the first storage device as the candidate device; and selecting another placement rule from the set of placement rules that has a DVS indicating the next highest degree of relevancy; and (g) iterating steps (b) through (f) until a storage device is identified for storing the data unit or until all the placement rules in the set of placement rules have been processed; and (h) if all the placement rules in the set of placement rules have been processed and a storage device has not been identified for storing the data unit, selecting the storage device marked as the candidate device for storing the data unit.

17. In a storage environment comprising a plurality of storage devices, a data processing system for identifying a storage device from the plurality of storage devices for storing data, the data processing system comprising:

a processor;

a memory coupled to the processor, the memory configured to store a plurality of code modules for execution by the processor, the plurality of code modules comprising:

a code module for receiving a signal to store a data unit;

a code module for identifying a set of one or more placement rules configured for the storage environment, each placement rule identifying criteria to be used for selecting a storage device for storing data, the criteria comprising data-related criteria and device-related criteria, the data-related criteria identifying one or more conditions related to one or more characteristics of the data to be stored and the device-related criteria identifying one or more conditions related to one or more storage device characteristics;

a code module for calculating a data value score (DVS) for each placement rule in the set of placement rules based upon the data-related criteria of the placement rule and characteristics of the data unit to be stored, wherein the DVSs calculated for the set of placements rules are used to select a placement rule from the set of placement rules to be used for determining a storage device for storing the data unit; and a code module for determining a storage device, from the plurality of storage devices, for storing the data unit based upon the set of placement rules and their associated DVSs, characteristics of the plurality of storage devices, and characteristics of the data unit to be stored.

18. The system of claim 17 wherein the DVS for a placement rule provides a measure of a degree of matching between the one or more conditions specified in the data-related criteria of the placement and the characteristics of the data unit to be stored.

19. The system of claim 17 wherein:

the data-related criteria for a placement rule comprises:

usage criteria comprising one or more conditions related to access information associated with a data unit; and unit selection criteria comprising one or more conditions related to characteristics of a data unit; and the code module for calculating a data value score (DVS) for each placement rule in the set of placement rules comprises:

a code module for generating a usage score for the placement rule based upon the usage criteria for the placement rule and access information associated with the data unit to be stored;

a code module for generating a unit selection score for the placement rule based upon the unit selection criteria for the placement rule and characteristics of the data unit to be stored; and a code module for generating the DVS for the placement rule based upon the usage score and the unit selection score.

20. The system of claim 17 wherein the code module for determining the storage device from the plurality of storage devices for storing the data unit comprises:

a code module for selecting a first placement rule from the set of placement rules based upon the DVSs associated with the set of placement rules;

a code module for calculating a relative storage value score (RSVS) for each storage device in the plurality of storage devices based upon the device-related criteria of the first placement rule, the characteristics of the data unit, and characteristics of the storage device; and a code module for selecting a storage device from the plurality of storage devices for storing the data unit based upon the RSVSs calculated for the plurality of storage devices.

21. The system of claim 20 wherein the RSVS for a storage device is directly proportional to the bandwidth supported by the storage device, directly proportional to the extent to which the storage device can store data without exceeding a threshold capacity, and inversely proportional to cost of storing data on the storage device.

22. The system of claim 21 wherein the RSVS for a storage device is directly proportional to availability of the storage device.

23. The system of claim 21 wherein the code module for selecting a storage device from the plurality of storage devices for storing the data unit based upon the RSVSs calculated for the plurality of storage devices comprises:

a code module for selecting, from the plurality of storage devices, a storage device having the highest RSVS value.

24. The system of claim 20 wherein the RSVS calculated for a storage device indicates whether the storage device can support a device bandwidth value specified in the device-related criteria of the first placement rule.

25. The system of claim 20 wherein the RSVS calculated for a storage device indicates whether the storage device can store the data unit without exceeding a capacity threshold associated with the storage device.

26. The system of claim 20 wherein the code module for selecting the first placement rule comprises a code module for selecting a placement rule with the highest DVS as the first placement rule.

27. The system of claim 26 wherein the code module for selecting a placement rule with the highest DVS comprises:

if the highest DVS is associated with multiple placement rules, a code module for using tie-breaking rules to select a placement rule from the multiple placement rules as the first placement rule.

28. The system of claim 17 wherein the code module for determining the storage device for storing the data unit comprises:
 a code module for, based upon DVSs calculated for the set of placement rules, selecting a first placement rule from the plurality of placement rules;
 a code module for identifying a first set of storage devices from the plurality of storage devices based upon the device-related criteria of the first placement rule;
 a code module for generating, for each storage device in the first set of storage devices, a relative storage value score (RSVS) based upon the device-related criteria of the first placement rule, characteristics of the data unit, and characteristics of the storage device; and
 a code module for selecting a storage device from the plurality of storage devices for storing the data unit based upon the RSVSs calculated for the plurality of storage devices.

29. The system of claim 28 wherein:
 the RSVS for a storage device is calculated based upon bandwidth supported by the storage device,
  device bandwidth value specified in the device-related criteria of the first placement rule;
  desired threshold capacity configured for the storage device, the desired threshold capacity indicating a portion of total capacity of the device allocated for storing the data unit, and
  current usage information for the storage device, the current usage information indicates a portion of the storage device that is being used for storing data of a particular type, and
  cost of storing data on the storage device; and
 the code module for generating a RSVS for each storage device in the first set of storage devices comprises:
  a code module for generating a RSVS having a value of zero if the storage device is not capable of satisfying the bandwidth requirements specified by the first placement rule;
  a code module for generating a RSVS having a value greater than zero if the storage device is capable of satisfying the bandwidth requirements specified by the first placement rule and can store the data unit without exceeding a capacity threshold associated with the storage device; and
  a code module for generating a RSVS having a value less than zero if the storage device is capable of satisfying the bandwidth requirements specified by the first placement rule and cannot store the data unit without exceeding a capacity threshold associated with the storage device.

30. The system of claim 29 wherein the code module for selecting a storage device from the first set for storing the data unit comprises a code module for selecting a device with the highest RSVS.

31. The system of claim 17 wherein:
 the DVS for a placement rule indicates a degree of relevancy of the placement rule to the data unit to be stored; and
 the code module for determining a storage device from the plurality of storage devices for storing the data unit comprises a code module for:
  (a) selecting a placement rule having a DVS indicating the highest degree of relevancy;
  (b) identifying a first set of storage devices from the plurality of devices based upon the selected placement rule;
  (c) generating a relative storage value score (RSVS) for each storage device in the first set of storage devices based upon the device-related criteria of the first placement rule, characteristics of the data unit, and characteristics of the storage device, the RSVS for a storage device indicating whether the storage device can satisfy bandwidth requirements specified by the selected placement rule and indicating if the storage device can store the data unit without exceeding a capacity threshold associated with the storage device;
  (d) determining if at least one storage device in the first set of storage devices is capable of satisfying the bandwidth requirements specified by the selected placement rule and can store the data unit without exceeding a capacity threshold associated with the storage device;
  (e) if it is determined that at least one storage device in the first set of storage devices is capable of satisfying the bandwidth requirements specified by the selected placement rule and can store the data unit without exceeding a capacity threshold associated with the storage device, selecting, based upon RSVSs generated for the storage devices, a storage device that is capable of satisfying the bandwidth requirements specified by the selected placement rule and can store the data unit without exceeding a capacity threshold associated with the storage device;
  (f) if no storage device in the first set of devices is capable of satisfying the bandwidth requirements specified by the selected placement rule and can store the data unit without exceeding a capacity threshold associated with the storage device, selecting another placement rule from the set of placement rules that has a DVS indicating the next highest degree of relevancy; and
  (g) iterating step (b) through (f) until a storage device is identified for storing the data unit that is capable of satisfying the bandwidth requirements specified by the first placement rule and can store the data unit without exceeding a capacity threshold associated with the storage device.

32. The system of claim 17 wherein:
 the DVS for a placement rule indicates a degree of relevancy of the placement rule to the data unit to be stored; and
 the code module for determining a storage device from the plurality of storage devices for storing the data unit comprises a code module for:
  (a) selecting a placement rule having a DVS indicating the highest degree of relevancy;
  (b) identifying a first set of storage devices from the plurality of devices based upon the selected placement rule;
  (c) generating a relative storage value score (RSVS) for each storage device in the first set of storage devices based upon the device-related criteria of the first placement rule, characteristics of the data unit, and characteristics of the storage device, the RSVS for a storage device indicating a degree of desirability of storing the data unit on the storage device, the RSVS for a storage device indicating whether the storage device can satisfy bandwidth requirements specified by the selected placement rule and indicating if the storage device can store the data unit without exceeding a capacity threshold associated with the storage device;

(d) determining if at least one storage device in the first set of storage devices is capable of satisfying the bandwidth requirements specified by the selected placement rule and can store the data unit without exceeding a capacity threshold associated with the storage device;

(e) if it is determined that at least one storage device in the first set of storage devices is capable of satisfying the bandwidth requirements specified by the selected placement rule and can store the data unit without exceeding a capacity threshold associated with the storage device, selecting, based upon RSVSs generated for the storage devices, a storage device that is capable of satisfying the bandwidth requirements specified by the selected placement rule and can store the data unit without exceeding a capacity threshold associated with the storage device;

(f) if no storage device in the first set of devices is capable of satisfying the bandwidth requirements specified by the selected placement rule and can store the data unit without exceeding a capacity threshold associated with the storage device:
  determining a first storage device from the first set of storage devices that can store the storage unit and is more desirable for storing the data unit than other devices in the first set of storage devices as indicated by the RSVSs generated for the devices;
  determining if a storage device has been identified as a candidate device;
  if a storage device has been marked as a candidate device:
if the first storage device is more desirable for storing the data unit than the marked candidate device as indicated by the RSVSs associated with the first device and the marked candidate device, marking the first storage device as the candidate device; and
  selecting another placement rule from the set of placement rules that has a DVS indicating the next highest degree of relevancy; and (g) iterating steps (b) through (f) until a storage device is identified for storing the data unit or until all the placement rules in the set of placement rules have been processed; and (h) if all the placement rules in the set of placement rules have been processed and a storage device has not been identified for storing the data unit, selecting the storage device marked as the candidate device for storing the data unit.

33. A computer program product stored on a computer-readable storage medium for identifying a storage device for storing data in a storage environment comprising a plurality of storage devices, the computer program product comprising:
  code for receiving a signal to store a data unit;
  code for identifying a set of one or more placement rules configured for the storage environment, each placement rule identifying criteria to be used for selecting a storage device for storing data, the criteria comprising data-related criteria and device-related criteria, the data-related criteria identifying one or more conditions related to one or more characteristics of the data to be stored and the device-related criteria identifying one or more conditions related to one or more storage device characteristics;
  code for calculating a data value score (DVS) for each placement rule in the set of placement rules based upon the data-related criteria of the placement rule and characteristics of the data unit to be stored, wherein the DVSs calculated for the set of placements rules are used to select a placement rule from the set of placement rules to be used for determining a storage device for storing the data unit; and
  code for determining a storage device, from the plurality of storage devices, for storing the data unit based upon the set of placement rules and their associated DVSs, characteristics of the plurality of storage devices, and characteristics of the data unit to be stored.

34. The computer program product of claim 33 wherein the DVS for a placement rule provides a measure of a degree of matching between the one or more conditions specified in the data-related criteria of the placement rule and the characteristics of the data unit to be stored.

35. The computer program product of claim 33 wherein:
  the data-related criteria for a placement rule comprises:
    usage criteria comprising one or more conditions related to access information associated with a data unit; and
    unit selection criteria comprising one or more conditions related to characteristics of a data unit; and
  the code for calculating a data value score (DVS) for each placement rule in the set of placement rules comprises:
    code for generating a usage score for the placement rule based upon the usage criteria for the placement rule and access information associated with the data unit to be stored;
    code for generating a unit selection score for the placement rule based upon the unit selection criteria for the placement rule and characteristics of the data unit to be stored; and
    code for generating the DVS for the placement rule based upon the usage score and the unit selection score.

36. The computer program product of claim 33 wherein the code for determining the storage device from the plurality of storage devices for storing the data unit comprises:
  code for selecting a first placement rule from the set of placement rules based upon the DVSs associated with the set of placement rules;
  code for calculating a relative storage value score (RSVS) for each storage device in the plurality of storage devices based upon the device-related criteria of the first placement rule, the characteristics of the data unit, and characteristics of the storage device; and
  code for selecting a storage device from the plurality of storage devices for storing the data unit based upon the RSVSs calculated for the plurality of storage devices.

37. The computer program product of claim 36 wherein the RSVS for a storage device is directly proportional to the bandwidth supported by the storage device, directly proportional to the extent to which the storage device can store data without exceeding a threshold capacity, and inversely proportional to cost of storing data on the storage device.

38. The computer program product of claim 37 wherein the RSVS for a storage device is directly proportional to availability of the storage device.

39. The computer program product of claim 37 wherein the code for selecting a storage device from the plurality of storage devices for storing the data unit based upon the RSVSs calculated for the plurality of storage devices comprises:
  code for selecting, from the plurality of storage devices, a storage device having the highest RSVS value.

40. The computer program product of claim 36 wherein the RSVS calculated for a storage device indicates whether the storage device can support a device bandwidth value specified in the device-related criteria of the first placement rule.

41. The computer program product of claim 36 wherein the RSVS calculated for a storage device indicates whether the storage device can store the data unit without exceeding a capacity threshold associated with the storage device.

42. The computer program product of claim 36 wherein the code for selecting the first placement rule comprises code for selecting a placement rule with the highest DVS as the first placement rule.

43. The computer program product of claim 42 wherein the code for selecting a placement rule with the highest DVS comprises:
if the highest DVS is associated with multiple placement rules, code for using tie-breaking rules to select a placement rule from the multiple placement rules as the first placement rule.

44. The computer program product of claim 33 wherein the code for determining the storage device for storing the data unit comprises:
code for selecting, based upon DVSs calculated for the set of placement rules, a first placement rule from the plurality of placement rules;
code for identifying a first set of storage devices from the plurality of storage devices based upon the device-related criteria of the first placement rule;
code for generating, for each storage device in the first set of storage devices, a relative storage value score (RSVS) based upon the device-related criteria of the first placement rule, characteristics of the data unit, and characteristics of the storage device; and
code for selecting a storage device from the plurality of storage devices for storing the data unit based upon the RSVSs calculated for the plurality of storage devices.

45. The computer program product of claim 44 wherein:
the RSVS for a storage device is calculated based upon
bandwidth supported by the storage device,
device bandwidth value specified in the device-related criteria of the first placement rule;
desired threshold capacity configured for the storage device, the desired threshold capacity indicating a portion of total capacity of the device allocated for storing the data unit, and
current usage information for the storage device, the current usage information indicates a portion of the storage device that is being used for storing data of a particular type, and
cost of storing data on the storage device; and
the code for generating a RSVS for each storage device in the first set of storage devices comprises:
code for generating a RSVS having a value of zero if the storage device is not capable of satisfying the bandwidth requirements specified by the first placement rule;
code for generating a RSVS having a value greater than zero if the storage device is capable of satisfying the bandwidth requirements specified by the first placement rule and can store the data unit without exceeding a capacity threshold associated with the storage device; and
code for generating a RSVS having a value less than zero if the storage device is capable of satisfying the bandwidth requirements specified by the first placement rule and cannot store the data unit without exceeding a capacity threshold associated with the storage device.

46. The computer program product of claim 45 wherein the code for selecting a storage device from the first set for storing the data unit comprises code for selecting a storage device with the highest RSVS.

47. The computer program product of claim 33 wherein:
the DVS for a placement rule indicates a degree of relevancy of the placement rule to the data unit to be stored; and
the code for determining a storage device from the plurality of storage devices for storing the data unit comprises code for:
(a) selecting a placement rule having a DVS indicating the highest degree of relevancy;
(b) identifying a first set of storage devices from the plurality of devices based upon the selected placement rule;
(c) generating a relative storage value score (RSVS) for each storage device in the first set of storage devices based upon the device-related criteria of the first placement rule, characteristics of the data unit, and characteristics of the storage device, the RSVS for a storage device indicating whether the storage device can satisfy bandwidth requirements specified by the selected placement rule and indicating if the storage device can store the data unit without exceeding a capacity threshold associated with the storage device;
(d) determining if at least one storage device in the first set of storage devices is capable of satisfying the bandwidth requirements specified by the selected placement rule and can store the data unit without exceeding a capacity threshold associated with the storage device;
(e) if it is determined that at least one storage device in the first set of storage devices is capable of satisfying the bandwidth requirements specified by the selected placement rule and can store the data unit without exceeding a capacity threshold associated with the storage device, selecting, based upon RSVSs generated for the storage devices, a storage device that is capable of satisfying the bandwidth requirements specified by the selected placement rule and can store the data unit without exceeding a capacity threshold associated with the storage device;
(f) if no storage device in the first set of devices is capable of satisfying the bandwidth requirements specified by the selected placement rule and has can store the data unit without exceeding a capacity threshold associated with the storage device, selecting another placement rule from the set of placement rules that has a DVS indicating the next highest degree of relevancy; and
(g) iterating step (b) through (f) until a storage device is identified for storing the data unit that is capable of satisfying the bandwidth requirements specified by the first placement rule and can store the data unit without exceeding a capacity threshold associated with the storage device.

48. The computer program product of claim 33 wherein:
the DVS for a placement rule indicates a degree of relevancy of the placement rule to the data unit to be stored; and
the code for determining a storage device from the plurality of storage devices for storing the data unit comprises code for:
(a) selecting a placement rule having a DVS indicating the highest degree of relevancy;

(b) identifying a first set of storage devices from the plurality of devices based upon the selected placement rule;

(c) generating a relative storage value score (RSVS) for each storage device in the first set of storage devices based upon the device-related criteria of the first placement rule, characteristics of the data unit, and characteristics of the storage device, the RSVS for a storage device indicating a degree of desirability of storing the data unit on the storage device, the RSVS for a storage device indicating whether the storage device can satisfy bandwidth requirements specified by the selected placement rule and indicating if the storage device can store the data unit without exceeding a capacity threshold associated with the storage device;

(d) determining if at least one storage device in the first set of storage devices is capable of satisfying the bandwidth requirements specified by the selected placement rule and can store the data unit without exceeding a capacity threshold associated with the storage device;

(e) if it is determined that at least one storage device in the first set of storage devices is capable of satisfying the bandwidth requirements specified by the selected placement rule and can store the data unit without exceeding a capacity threshold associated with the storage device, selecting, based upon RSVSs generated for the storage devices, a storage device that is capable of satisfying the bandwidth requirements specified by the selected placement rule and can store the data unit without exceeding a capacity threshold associated with the storage device;

(f) if no storage device in the first set of devices is capable of satisfying the bandwidth requirements specified by the selected placement rule and can store the data unit without exceeding a capacity threshold associated with the storage device:

determining a first storage device from the first set of storage devices that can store the storage unit and is more desirable for storing the data unit than other devices in the first set of storage devices as indicated by the RSVSs generated for the devices;

determining if a storage device has been identified as a candidate device;

if a storage device has been marked as a candidate device:

if the first storage device is more desirable for storing the data unit than the marked candidate device as indicated by the RSVSs associated with the first device and the marked candidate device, marking the first storage device as the candidate device; and selecting another placement rule from the set of placement rules that has a DVS indicating the next highest degree of relevancy; and (g) iterating steps (b) through (f) until a storage device is identified for storing the data unit or until all the placement rules in the set of placement rules have been processed; and (h) if all the placement rules in the set of placement rules have been processed and a storage device has not been identified for storing the data unit, selecting the storage device marked as the candidate device for storing the data unit.

49. In a storage environment comprising a plurality of storage devices, a system for identifying a storage device from the plurality of storage devices for storing data, the system comprising:

means for receiving a signal to store a data unit;

means for identifying a set of one or more placement rules configured for the storage environment, each placement rule identifying criteria to be used for selecting a storage device for storing data, the criteria comprising data-related criteria and device-related criteria, the data-related criteria identifying one or more conditions related to one or more characteristics of the data to be stored and the device-related criteria identifying one or more conditions related to one or more storage device characteristics;

means for calculating a data value score (DVS) for each placement rule in the set of placement rules based upon the data-related criteria of the placement rule and characteristics of the data unit to be stored, wherein the DVSs calculated for the set of placements rules are used to select a placement rule from the set of placement rules to be used for determining a storage device for storing the data unit; and means for determining a storage device, from the plurality of storage devices, for storing the data unit based upon the set of placement rules and their associated DVSs, characteristics of the plurality of storage devices, and characteristics of the data unit to be stored.

* * * * *